(12) United States Patent
Yang et al.

(10) Patent No.: US 10,884,813 B2
(45) Date of Patent: *Jan. 5, 2021

(54) DISTRIBUTED RESOURCE ALLOCATION

(71) Applicant: Advanced New Technologies Co., Ltd., Grand Cayman (KY)

(72) Inventors: Shuanghong Yang, Hangzhou (CN); Xingwen Zhang, Hangzhou (CN); Zhigang Hua, Hangzhou (CN); Feng Qi, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 16/904,903

(22) Filed: Jun. 18, 2020

(65) Prior Publication Data

US 2020/0341817 A1    Oct. 29, 2020

Related U.S. Application Data

(63) Continuation of application No. 16/671,046, filed on Oct. 31, 2019, now Pat. No. 10,691,499, which is a (Continued)

(51) Int. Cl.
  *G06F 9/46* (2006.01)
  *G06F 9/50* (2006.01)
(52) U.S. Cl.
  CPC .......... *G06F 9/5066* (2013.01); *G06F 9/5044* (2013.01); *G06F 9/5055* (2013.01)
(58) Field of Classification Search
  None
  See application file for complete search history.

(56) References Cited

U.S. PATENT DOCUMENTS 6,704,692 B1    3/2004 Banerjee
7,243,167 B2    7/2007 Zimmer et al.
(Continued)

FOREIGN PATENT DOCUMENTS

WO    WO 2019050513    3/2019

OTHER PUBLICATIONS

Fang et al. "Resource Allocation in Load-Constrained MultihopWireless Networks", 2012 IEEE, pp. 280-288.*
(Continued)

*Primary Examiner* — Van H Nguyen
(74) *Attorney, Agent, or Firm* — Fish & Richardson P.C.

(57) ABSTRACT

Disclosed herein are methods, systems, and apparatus, including computer programs encoded on computer storage media, for performing allocation of M resources among N users into K pools by solving a knapsack problem (KP) using a distributed computing system that includes a number of individual solvers. The method includes: receiving data representing K global constraints and L local constraints of the KP; decomposing the KP into N sub-problems using K dual multipliers, each of the N sub-problems corresponding to a respective one of the N users and subject to the L local constraints w.r.t. the corresponding user, wherein N is in an order of billions or larger; determining the number of individual solvers for solving the N sub-problems; distributing the N sub-problems among the number of individual solvers; and solving the KP by the distributed computing system by performing two or more iterations.

18 Claims, 20 Drawing Sheets

Related U.S. Application Data continuation of application No. PCT/US2019/029011, filed on Apr. 24, 2019.

(56) References Cited

U.S. PATENT DOCUMENTS

| | | | |
|---|---|---|---|
| 7,594,016 | B1 | 11/2009 | Zhou et al. |
| 7,653,561 | B2* | 1/2010 | Bergstrom ......... G06Q 10/0631 705/7.22 |
| 7,660,734 | B1 | 2/2010 | Neal et al. |
| 7,886,055 | B1 | 2/2011 | Zhou et al. |
| 8,112,755 | B2 | 2/2012 | Apacible et al. |
| 8,412,551 | B2 | 4/2013 | Feng et al. |
| 8,983,881 | B2* | 3/2015 | Fox ........................ G06Q 10/04 706/12 |
| 9,021,094 | B1 | 4/2015 | Zhou et al. |
| 9,292,349 | B2 | 3/2016 | Clark et al. |
| 9,424,094 | B2 | 8/2016 | Cardosa et al. |
| 9,740,526 | B2 | 8/2017 | Majewski et al. |
| 10,691,499 | B1 | 6/2020 | Yang et al. |
| 10,698,693 | B1 | 6/2020 | Zhang et al. |
| 2006/0259878 | A1 | 11/2006 | Killian et al. |
| 2008/0244506 | A1 | 10/2008 | Killian et al. |
| 2011/0041066 | A1 | 2/2011 | Kimmet |
| 2012/0215576 | A1 | 8/2012 | Jensen et al. |
| 2014/0006626 | A1 | 1/2014 | Breiter et al. |
| 2015/0113542 | A1 | 4/2015 | Cadambi et al. |
| 2017/0070956 | A1 | 3/2017 | Prasad et al. |
| 2017/0352003 | A1 | 12/2017 | Bertoli et al. |

OTHER PUBLICATIONS

Pienkosz et al. "Reduction Strategies for the Cardinality Constrained Knapsack Problem", 2017 IEEE, pp. 945-948.*

Cao et al., "Large-Scale and Big Optimization Based on Hadoop", Big Data Optimization: Recent Developments and Challenges, 2016, pp. 375-389.

Crosby et al., "BlockChain Technology: Beyond Bitcoin," Sutardja Center for Entrepreneurship & Technology Technical Report, Oct. 16, 2015, 35 pages.

Extended European Search Report in European Application No. 19789848.9, dated Apr. 1, 2020, 10 pages.

Freville et al., "The Multidimensional 0-1 Knapsack Problem-Bounds and Computational Aspects," Annals of Operations Research, 139(1):195-227.

Hifi et al., "Local Branching-Based Algorithm for the Disjunctively Constrained Knapsack Problem," International Conference on Computers & Industrial Engineering, Aug. 2009, 60(4):279-284.

Hirennath, "New Heuristic and Metaheuristic Approaches Applied to the Multiple-choice Multidimensional Knapsack Problem," Wright State University CORE Scholar, Feb. 2008, 253 pages.

International Search Report and Written Opinion in International Application No. PCT/US2019/028973, dated Jul. 30, 2019, 7 pages.

Islam et al., "Heuristic Algorithm of the Multiple-Choice Multidimensional Knapsack Problem (MMKP) for Cluster Computing," 12th International Conference on Computers and Information Technology, Dec. 2009, pp. 157-161.

Jia et al, "Lagrangian Dual Decomposition for Joint Resource Allocation Optimization Problem in OFDMA Downlink Networks," Hindawi Mathematical Problems in Engineering, Oct. 2018, 2018:1-10.

Lau et al., "A Lagrangian Based Immune-Inspired Optimization Framework for Distributed Systems," IEEE International Conference on Systems, Man and Cybernetics, Oct. 2008, pp. 1326-1331.

Moser et al. "An Algorithm for the Multidimensional Multiple-Choice Knapsack Problem," IEICE Transactions on Fundamentals of Electronics, Communications and Computer Sciences, E89-1(3):582-589.

Nakamoto, "Bitcoin: A Peer-to-Peer Electronic Cash System," www.bitcoin.org, 2005, 9 pages.

Palomar et al., "A Tutorial on Decomposition Methods for Network Utility Maximization", Journal on Selected Areas in Communication, Aug. 2006, vol. 24, No. 8, 13 pages.

Pandit et al., "Resource Allocation in Cloud using Simulated Annealing," Applications and Innovations in Mobile Computing, Apr. 2014, pp. 12-27.

PCT International Search Report and Written Opinion in International Application No. PCT/US2019/029011, dated Jul. 30, 2019, 8 pages.

Wikipedia.org [online], "Knapsack problem," Dec. 20, 2019, retrieved on Jan. 7, 2020, retrieved from URL<https://en.wikipedia.org/wiki/Knapsack_problem>, 8 pages.

Zhang et al., "Solving Billion-Scale Knapsack Problems via Distributed Synchronous Coordinate Descent," KDD' 2019, 2019, 10 pages.

U.S. Appl. No. 16/915,627, filed Jun. 29, 2020, Xingwen Zhang.

Agarwal et al., "Personalized Click Shaping through Lagrangian Duality for Online Recommendation," Proceedings of the 35th International ACM SIGIR Conference on Research and Development in Information Retrieval, Aug. 2012, pp. 485-494.

Chen, "Large Scale Strategic Decision making in Multi-agent Systems," NanYang Technological University Doctoral Dissertation, Jul. 2018, 180 pages.

Fioretto et al., "Exploiting GPUs in Solving (Distributed) Constraint Optimization Problems with Dynamic Programming," International Conference on Principles and Practice of Constraint Programming, Aug. 2015, pp. 121-139.

Vidal et al., "Separable Convex Optimization with Nested Lower and Upper Constraints," Informs Journal on Dptimization, Oct. 2018, 1(1):1-36.

Zeng et al., "Distributed Algorithm for Robust Resource Allocation with Polyhedral Uncertain Allocation Parameters," Journal of Systems Science and Complexity, Feb. 2018, 31"103-119.

* cited by examiner

```
                      Algorithm 1
      ┌ Procedure  Map (p_i, b_i, c_i, λ^t)
      │    solve x_{i,j} for (11)
      │    for each  k ∈ {1, ..., K} do
210 ──┤                    M
      │         value =   Σ   b_{i,j,k} x_{i,j}
      │                  j=1
      │         emit( k, value)
      └    end 220 ──{ Procedure  Reduce (k, [value])
        │   return  Σ value ┌ initialize λ^0
      │ for t ← 0 to T − 1 do
      │     # Parallel
      │     for each i ∈ {1,..., N} do       ◄── 252
      │     │   Map (p_i, b_i, c_i, λ^t)
      │     end
      │     # Parallel
      │     for each k ∈ {1,..., K} do       ◄── 254
250 ──┤     │   R_k = Reduced ( k, [value] )
      │     end
      │     for each k ∈ {1,..., K} do       ◄── 256
      │     │   λ_k^{t+1} = λ_k^t + α(R_k − B_k)
      │     │   λ_k^{t+1} = max (0, λ_k^{t+1})
      │     end
      │     if λ^t has converged then        ◄── 258
      │     │   return λ^t
      │     end
      │ end
      └ return λ^T
```

FIG. 2

Algorithm 2

410 — initialize $x_{i,j}$ for all $j = 1,...,M$
420 — sort indices $j \in \{1,...,M\}$ in a non-increasing order of $\tilde{p}_{i,j}$
430 — for $S(l)$ in a topological ordering of the DAG do
440 —     fetch the indices $j \in S(l)$ with $x_{i,j} = 1$
450 —     update $x_{i,j} = 0$ if $j$ is not in top $C_l$ sorted indices
end
460 — return $x_{i,j}$ $j = 1,...,M$

---
Algorithm 3
---

\# Procedure Intersect $(f, g)$ returns a non-negative $\lambda_k$
\# at which $f(\lambda_k) == g(\lambda_k) \geq 0$ when $f$ and $g$ are not parallel
Procedure CalculateIntersectionPoints $(p_i, b_i, \lambda^t, k)$ $\quad \Lambda_k = \emptyset$
$\quad$ for each $j \in \{1,...,M\}$ do
$$f_j(\lambda_k) = (p_{i,j} - \sum_{k'=1, k' \neq k}^{K} \lambda_{k'}^t b_{i,j,k'}) - \lambda_k b_{i,j,k}$$
$\quad\quad g(\lambda_k) = 0$ \# This is the horizontal axis.
$\quad\quad \Lambda_k = \Lambda_k \cup$ Intersect $(f_j, g)$
$\quad\quad$ for each $j' \in \{j+1,...,M\}$ do
$$f_{j'}(\lambda_k) = (p_{i,j'} - \sum_{k'=1, k' \neq k}^{K} \lambda_{k'}^t b_{i,j',k'}) - \lambda_k b_{i,j',k}$$
$\quad\quad\quad \Lambda_k = \Lambda_k \cup$ Intersect $(f_j, f_{j'})$
$\quad$ end
end
return the set of non-duplicate values in $\Lambda_k$

FIG. 6

```
Algorithm 4
```

Procedure Map($p_i$, $b_i$, $c_i$, $\lambda^t$)
    for each $k \in \{1,\ldots,K\}$ do
        $\Lambda_k$ = CalculateIntersectionPoints ($p_i$, $b_i$, $\lambda^t$, $k$) ← 712
        sort $\Lambda_k$ in a decreasing order ← 714
        previous_sum = 0
        for each $\lambda_k$ in $\Lambda_k$ do
            $\lambda = (\lambda_1^t,\ldots,\lambda_{k-1}^t, \lambda_k, \lambda_{k+1}^t,\ldots,\lambda_K^t)$
            solve $x_{i,j}$ with multipliers $\lambda$ using Algorithm 2 ← 715
            current_sum = $\sum_{j=1}^{M} b_{i,j,k} x_{i,j}$ ← 716
            if current_sum == previous_sum then
                continue
            end
            $v_1 = \lambda_k$
            $v_2$ = current_sum - previous_sum
            value = $[v_1, v_2]$
            emit($k$, value) ← 718
            previous_sum = current_sum
        end
    end

710 {

Procedure Reduce($k, [v_1, v_2]$)
    if $\sum v_2 \leq B_k$ then
        return 0
    else
        return minimal threshold $v$ such that $\sum_{v_1 \geq v} v_2 \leq B_k$ ← 722
    end

720 { initialize $\lambda^0$
for $t \leftarrow 0$ to $T-1$ do
    # Parallel
    for each $i \in \{1,\ldots,N\}$ do ← 752
        Map($p_i$, $b_i$, $c_i$, $\lambda^t$)
    end
    # Parallel
    for each $k \in \{1,\ldots,K\}$ do ← 754
        $\lambda_k^{t+1}$ = Reduce($k, [v_1, v_2]$)
    end
    if $\lambda^t$ has converged then ← 756
        return $\lambda^t$
    end
end
return $\lambda^T$

Algorithm 5

```
Procedure  Map (p_i, b_i, c_i, λ^t)
    initialize adjusted_profits as an array of K numbers
    foreach k ∈ {1,..., K} do
    |   adjusted_profits[k] = max(p_{i,k} - λ^t_k b_{i,k,k}, 0)
    end
    Q_th_largest = quick_select(adjusted_profits, Q)
    Q1_th_largest = quick_select(adjusted_profits, Q + 1)
    foreach k ∈ {1,..., K} do
    |   if adjusted_profits[k] ≥ Q_th_largest then
    |   |   p̄ = Q1_th_largest
    |   else
    |   |   p̄ = Q_th_largest
    |   end
    |   if p_{i,k} > p̄ then
    |   |   v_1 = (p_{i,k} - p̄) / b_{i,k,k}
    |   |   v_2 = b_{i,k,k}
    |   |   value = [v_1, v_2]
    |   |   emit(k, value)
    |   end
    end
```

Algorithm 6

$\lambda^0 = (1.0, ..., 1.0)$ # $K$ default values
for $t \leftarrow 0$ to $\tau - 1$ do
    sample a small set of $n$ random groups $\tilde{G}$
    $\tilde{B}_k = \frac{n}{N} B_k$ for all $k = 1, ... K$
    if $t = 0$ then
        $\tilde{\lambda} = \lambda^0$
    else
        $\tilde{\lambda} = \frac{1}{t} \sum_{s=1}^{t} \lambda^s$
    end
    compute $\lambda^{t+1}$ by applying Algorithm 4 to $\tilde{G}$ with budgets $\tilde{B}_k$ and initial multipliers $\tilde{\lambda}$
end
return $\frac{1}{T} \sum_{t=1}^{T} \lambda^t$

FIG. 9

Table 1: Number of SCD iterations with/without Pre-solving

| N | no pre-solving | pre-solving | % of reduction |
|---|---|---|---|
| 1 million | 35 | 21 | 40% |
| 10 million | 32 | 8 | 75% |
| 100 million | 32 | 13 | 59% |

FIG. 11

Table 2. Results for 100 million users (with up to 10 billion items)

| K | 1 | 5 | 10 | 20 | 100 |
|---|---|---|---|---|---|
| Number of iterations | 2 | 13 | 18 | 14 | 10 |
| Primal value | 40,631,183.07 | 73,000,742.85 | 85,378,580.47 | 92,415,786.11 | 98,436,146.56 |
| Duality gap | 0 | 302.71 | 290.74 | 301.04 | 225.15 |
| Number of constraint violations | 0 | 0 | 0 | 0 | 0 |

FIG. 12

```
┌────────────────────────────────────────────────────────────────────────┐
│ Receive data representing L constraints, wherein each of the L         │
│ constraints corresponds to a subset of M resources and restricts a     │──── 1402b
│ respective maximum number C of resources to be selected among the      │
│ subset of the M resources, wherein any subset corresponding to a       │
│ first constraint out of the L constraints has no common resource with  │
│ any other subset corresponding to a second constraint out of the L     │
│ constraints, unless the subset corresponding to the first constraint   │
│ is a subset of the other subset corresponding to the second constraint │
└────────────────────────────────────────────────────────────────────────┘
                                   ↓
┌────────────────────────────────────────────────────────────────────────┐
│ Determine a topological ordering of the L constraints, wherein the     │──── 1404b
│ topological ordering defines a traversing order of the L constraints   │
└────────────────────────────────────────────────────────────────────────┘
                                   ↓
┌────────────────────────────────────────────────────────────────────────┐
│ Select all the M resources as an initial selection                     │──── 1406b
└────────────────────────────────────────────────────────────────────────┘
                                   ↓
┌────────────────────────────────────────────────────────────────────────┐
│ Obtain data representing M profits, each profit corresponding to one   │──── 1408b
│ of the M resources respectively                                        │
└────────────────────────────────────────────────────────────────────────┘
                                   ↓
┌────────────────────────────────────────────────────────────────────────┐
│ Sort the M resources in a non-increasing order according to the M      │──── 1410b
│ profits corresponding to the M resources                               │
└────────────────────────────────────────────────────────────────────────┘
                                   ↓
┌────────────────────────────────────────────────────────────────────────┐
│ Remove one or more resources from the initial selection by traversing  │──── 1412b
│ each constraint in the topological ordering of the L constraints       │
│  ┌──────────────────────────────────────────────────────────────────┐  │──── 1414b
│  │ for a constraint $l$ of the L constraints corresponding to a     │  │
│  │ subset $S_l$ of the M resources and restricting a maximum        │  │
│  │ number $C_l$ of resources to be selected out of the subset $S_l$,│  │
│  │  ┌────────────────────────────────────────────────────────────┐  │  │
│  │  │ Determine currently selected resources in the subset $S_l$ │──┼──┼── 1416b
│  │  └────────────────────────────────────────────────────────────┘  │  │
│  │                            ↓                                     │  │
│  │  ┌────────────────────────────────────────────────────────────┐  │  │
│  │  │ Determine, among the currently selected resources in the   │  │  │
│  │  │ subset $S_l$, any resource that is not one of $C_l$        │──┼──┼── 1418b
│  │  │ resources that have top $C_l$ profits among the currently  │  │  │
│  │  │ selected resources in the subset $S_l$                     │  │  │
│  │  └────────────────────────────────────────────────────────────┘  │  │
│  └──────────────────────────────────────────────────────────────────┘  │
└────────────────────────────────────────────────────────────────────────┘
                                   ↓
                              ╱─────────╲
                           ╱  All the L   ╲
           No, l = l+1 ←──⟨ constraints in the⟩──── 1420b
                           ╲ topological    ╱
                            ╲ordering have ╱
                             ╲traversed? ╱
                              ╲─────────╱
                                   │ Yes
                                   ↓
┌────────────────────────────────────────────────────────────────────────┐
│ Allocate the selected resources                                        │──── 1422b
└────────────────────────────────────────────────────────────────────────┘

DISTRIBUTED RESOURCE ALLOCATION

CROSS-REFERENCE TO RELATED APPLICATIONS

This application is a continuation of U.S. patent application Ser. No. 16/671,046, filed on Oct. 31, 2019, which is a continuation of PCT Application No. PCT/US2019/029011, filed on Apr. 24, 2019, and each application is hereby incorporated by reference in its entirety.

TECHNICAL FIELD

This specification relates to resource allocation.

BACKGROUND

Knapsack problems (KPs) can often be used to model resource allocation applications in real-world decision making processes. Examples of KPs include asset management, portfolio selection, and budget allocation, to name a few. For example, a KP is solved in order to decide notification volume for each user to optimize long-term user engagements. Real-world resource allocation applications are often approached by solving KPs but they have been tractable only at a relatively small scale. A number of variants of the knapsack problems have been studied in the literature, such as multi-dimensional knapsack problems (MDKPs), multi-choice knapsack problems (MCKPs), and multi-dimensional multi-choice knapsack problems (MMKPs). In MDKPs, there are multiple knapsack constraints and a resource item (also referred to as an item) which, when chosen, will consume resources from multiple knapsacks. MCKP is an extension of the classical single-constraint KP, where the items are partitioned into multiple groups and exactly one item from each group can be chosen. MMKP is a combination of MDKP and MCKP.

As one well-known special case of the integer programming (IP) problem, KP (including vanilla KP and its variants such as MDKP, MCKP, and MMKP) is NP-hard. Both exact and heuristic algorithms have been studied for solving these problems. Existing works studied KPs only at a relatively small scale (i.e., thousands to millions of decision variables).

With the increasing number of users, online platforms or service providers (e.g., e-commerce platform, social network platform, and online financial platform) have an increasing need to solve KPs at a large scale, for example, in the order of billions or more decision variables. Existing resource allocation solutions perform poorly on such large scales as they consume excessive computational resources and time. Techniques for solve KPs at large scale efficiently are desirable.

SUMMARY

This specification describes technologies for resource allocation. These technologies generally involve solving a knapsack problem (KP) subject to multiple global constraints and local constraints. The described techniques can reduce the computational complexity and improve the convergence speed in solving the KPs in an iterative manner.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

FIG. 2 is a pseudocode of an example of a MapReduce algorithm (also referred to as Algorithm 1) for solving knapsack problems, in accordance with embodiments of this specification.

FIG. 4 is a pseudocode of an example of a greedy algorithm (referred to as Algorithm 2) for solving an integer programming (IP) problem subject to constraints with a hierarchical structure, in accordance with embodiments of this specification.

FIG. 6 is a pseudocode of an example of an algorithm for computing candidate dual multipliers (also referred to as Algorithm 3), in accordance with embodiments of this specification.

FIG. 7 is a pseudocode of an example of a synchronous coordinate descent (SCD) algorithm (also referred to as Algorithm 4) with a MapReduce model for solving a KP, in accordance with embodiments of this specification.

FIG. 8 is a pseudocode of an example of a Map function (also referred to as Algorithm 5) for choosing up to a maximum number (denoted by Q) of resources for each user, in accordance with embodiments of this specification.

FIG. 9 is a pseudocode of an example of a pre-solving by sampling algorithm (also referred to as Algorithm 6), in accordance with embodiments of this specification.

FIG. 11 is a table (also referred to as Table 1) illustrating examples of number of SCD iterations with and without pre-solving, in accordance with embodiments of this specification.

FIG. 12 is a table (also referred to as Table 2) illustrating examples of experiment results of a distributed system using a SCD algorithm on large-scale test data sets, in accordance with embodiments of this specification.

FIG. 14B is a flowchart of an example of a process for performing resource allocation of M resources subject to L constraints, in accordance with embodiments of this specification.

Like reference numbers and designations in the various drawings indicate like elements.

DETAILED DESCRIPTION

Figure 1:
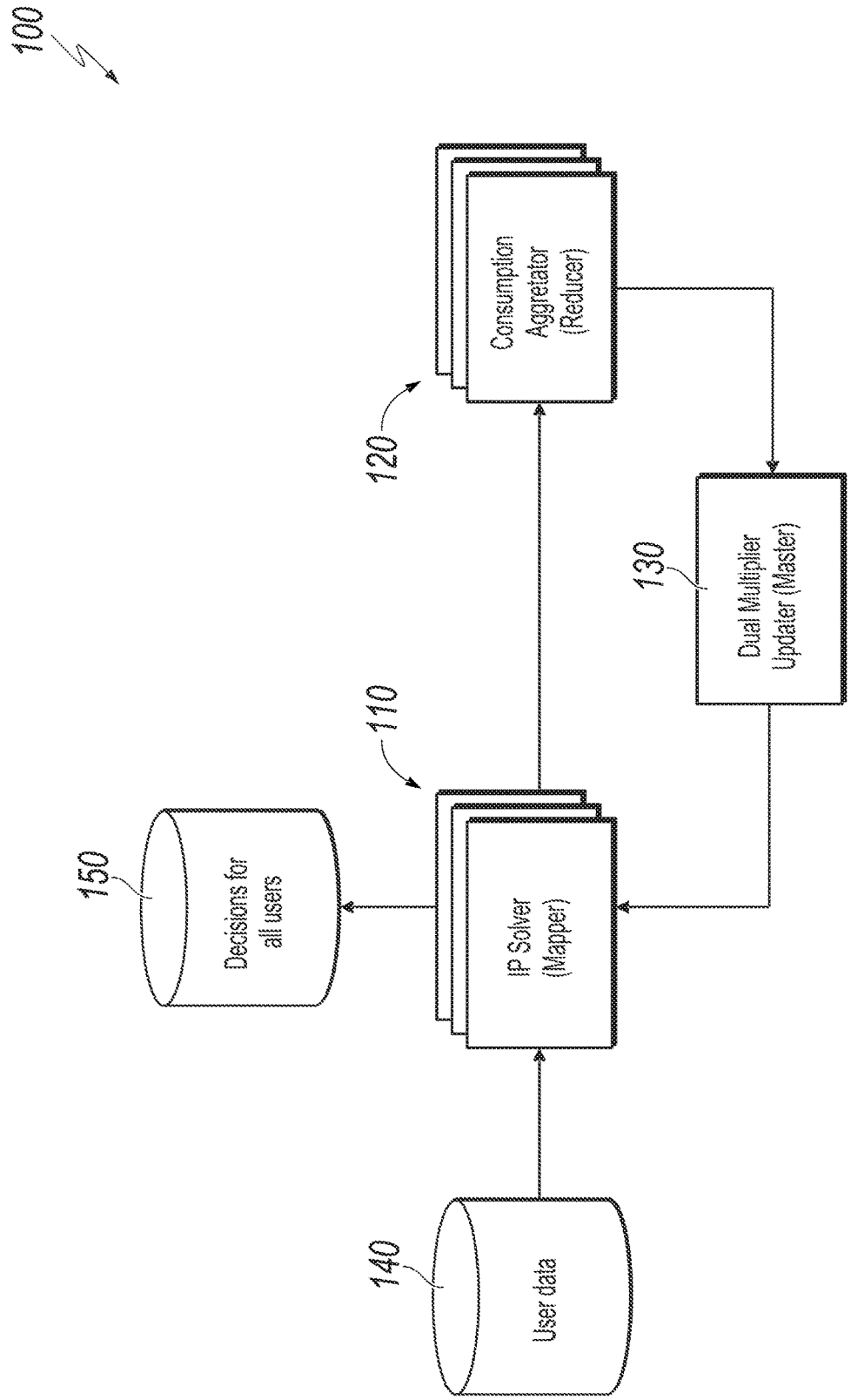
FIG. 1 is a diagram illustrating an example of a distributed computing system for solving a knapsack problem (KP) with an information flow, in accordance with embodiments of this specification.

This specification describes technologies for resource allocation. These technologies generally involve solving large-scale knapsack problems (KPs) in a scalable distributed paradigm via synchronous coordinate descent (SCD). In some embodiments, the described techniques can help solve KPs at the scale of billions or larger with more than one global constraint. In some embodiments, the described techniques can help solve such large-scale KPs without hurting the optimality of the solution or compromising the constraint requirements. In some embodiments, the technologies can be implemented with off-the-shelf distributed computing frameworks (e.g., MPI, Hadoop, Spark). In some embodiments, these technologies can save memory space, reduce the computational complexity, while improving the solving speed of the KPs. In some embodiments, these technologies can solve resource allocation problems at an unprecedented scale (e.g., KPs with billions of decisions and constraint variables can be solved within a few hours (e.g., in the order of $O(1)$ hour) whereas it could be computationally infeasible or significantly time-consuming for existing techniques to solve KPs on this large of a scale (e.g., KPs with billions of decisions and constraint variables cannot be solved by existing techniques within a few hours or days).

Knapsack problems (KPs) are very common in real-world decision making processes. Examples of KPs include asset management, portfolio selection, and budget allocation, to name a few. For example, in resource allocation scenarios in a financial industry setting, decisions are often made on a per user basis while the number of users can be large, for example, in the order of billion active users.

As an example, an online platform can provide its users a wide spectrum of financial products and services ranging from payment to banking, loans, wealth management, insurances, and so on. Various financial resources may be allocated among users on a daily basis. The resources can include, for example, financial budgets (e.g., loans, marketing promotions, ads spending, asset portfolios) that are to be distributed among users/user groups, or non-monetary resources such as user traffic (e.g., impressions, clicks, dwell time) that need to be allocated among different business channels (e.g., HUABEI aka ANT-CREDIT-PAY, JIEBEI aka ANT-CASH-NOW, YUEBAO aka ANT-MONEY-MARKET-FUND).

A resource allocation problem can be represented as a KP to optimize a joint objective, such as the expected user conversions in the case of marketing campaign, while respecting a set of constraints. In some embodiments, the constraints can be categorized into global constraints and local constraints.

Global constraints typically include resource constraints on a global level, involving multiple users. For example, a marketing campaign often has a global budget limit as well as maximum amount of resources available or allowable for each user-cohort (e.g., gender, geo, or user lifecycle stage) or each product channel.

Local constraints include restrictions that are only effective for either individual users or small groups of users. Throughout this specification, the terms "user" and "group" are used interchangeably. For example, a user can include a user group that includes one or more individual users. In some embodiments, local constraints are sparse in nature. In some embodiments, local constraints demonstrate hierarchical structures that can be leveraged to design efficient solvers.

In some embodiments, for a billion-scale KP, both decision variables and local constraints are at the level or in the order of billions (i.e., the order of magnitude is 9, denoted as $O(10^9)$, or larger), while the size of the global constraints is often small, for example, in the order of $O(1)$ to $O(100)$ (i.e., the order of magnitude is 1 to 2). Existing optimization approaches for solving KPs are only tractable at a much smaller scale.

This specification describes technologies for solving real-world KPs at billion-scale. Using the MapReduce computing model as an example, this specification describes a distributed framework for solving KPs by exploiting the decomposability of the dual problem. Instead of conventional dual descent algorithm that does not work so well as it requires manual hyper-parameter tuning and is prone to constraint violations, this specification describes a synchronous coordinate descent (SCD) algorithm that does not suffer from these issues.

Furthermore, this specification describes a solver for solving an integer programming (IP) problem subject to constraints that have a hierarchical structures. Unlike off-the-shelf IP solvers such as CPLEX or GUROBI, the solver uses a greedy algorithm that can solve an IP problem subject to hierarchical structure constraints in polynomial time. The described IP solver can be referred to as a hierarchical greedy IP solver. The hierarchical greedy IP solver can be used in the distributed framework for solving KPs, for example, by solving an IP sub-problem of the KPs by exploiting the hierarchical structure of the local constraints.

Simulation results conducted with both controlled and real-world settings show that the distributed SCD algorithm can solve KPs nearly optimally and scale nicely to billions of decision variables and constraints. Moreover, techniques to further speed up the algorithm in a distributed environment are described.

Consider the following generalized variant of a KP:

$$\max_{x_{i,j}} \sum_{i=1}^{N} \sum_{j=1}^{M} p_{i,j} x_{i,j} \quad (1)$$

subject to (s.t.)

$$\sum_{i=1}^{N} \sum_{j=1}^{M} b_{i,j,k} x_{i,j} \leq B_k, \forall k \in \{1, \ldots, K\} \quad (2)$$

$$\sum_{j=1}^{M} c_{i,j,l} x_{i,j} \leq C_l, \forall i \in \{1, \ldots, N\}, \forall l \in \{1, \ldots, L\} \quad (3)$$

$$x_{i,j} \in \{0, 1\}, \forall i \in \{1, \ldots, N\}, \forall j \in \{1, \ldots, M\} \quad (4)$$

where a set of M resources (or items) are to be allocated among a set of N users respecting K global constraints and L local constraints. If resource j is chosen for user i, i.e. $x_{i,j}=1$, a reward (can also be referred to as profit, utility, or gain) of $p_{i,j}$ is gained and an amount of resources $b_{i,j,k}$ is consumed for the k-th knapsack, for each k=1, ..., K. The input parameters $B_k$ and $C_l$ are strictly positive, (i.e., $B_k>0$ and $C_l>0$), while $p_{i,j}$ and $b_{i,j,k}$ are non-negative. The global constraints (2) limit the resources allocated for each knapsack, whereas the local constraints (3) restrict per-user selections. Without loss of generality, here the local constraints are on a per-user basis, as a local constraint on a sparse user set can be decomposed to a set of per-user constraints.

If Os are appropriately padded for the cost coefficients $c_{i,j,k}$ such that the cost tensor becomes dense, local constraints (3) will vanish and all the constraints will become global. In this sense, the formulation is a generalized variant of the multi-dimensional knapsack problems (MDKPs).

Note that, in the formulation, only binary decision variables are considered, i.e., $x_{i,j} \in \{0, 1\}$, but all the techniques described in the specification can be easily extended to categorical (i.e., non-negative integer) decision variables. The described techniques support categorical variables.

Define the following additional notations for the rest of the specification:

$p_i$: reward vector for user i,
$b_i$: global constraint coefficient matrix for user i,
$c_i$: local constraint coefficient matrix for user i,
$x_i$: decision variable vector for user i,
x: decision variable matrix for all users.

Given that the number of global constraints is much smaller than that of local constraints, a set of dual multipliers $\lambda = \{\lambda_k, k=1, 2, \ldots, K\}$ are introduced for the global constraints. Following the Lagrangian techniques for dual problem transformation, a pair $(x, \lambda)$ is searched for such that x maximizes $$\max_{x_{i,j}} \sum_{i=1}^{N} \sum_{j=1}^{M} p_{i,j} x_{i,j} - \sum_{k=1}^{K} \lambda_k \left( \sum_{i=1}^{N} \sum_{j=1}^{M} b_{i,j,k} x_{i,j} - B_k \right) \quad (5)$$

$$\text{s.t.} \sum_{j=1}^{M} c_{i,j,l} x_{i,j} \leq C_l, \forall i \in \{1, \ldots, N\}, \forall l \in \{1, \ldots, L\} \quad (6)$$

$$x_{i,j} \in \{0, 1\}, \forall i \in \{1, \ldots, N\}, \forall j \in \{1, \ldots, M\} \quad (7)$$

and that x and λ jointly satisfy the optimality conditions $$\lambda_k \left( \sum_{i=1}^{N} \sum_{j=1}^{M} b_{i,j,k} x_{i,j} - B_k \right) = 0, \forall k \in \{1, \ldots, K\} \quad (8)$$

$$\sum_{i=1}^{N} \sum_{j=1}^{M} b_{i,j,k} x_{i,j} - B_k \leq 0, \forall k \in \{1, \ldots, K\} \quad (9)$$

$$\lambda_k \geq 0, \forall k \in \{1, \ldots, K\} \quad (10)$$

Intuitively, each multiplier $\lambda_k$ (also referred to as Lagrangian multipliers, dual Lagrangian multipliers, or simply, multipliers) can be interpreted economically as the shadow price (or the marginal utility) of the k-th knapsack resource.

The maximization problem (5)-(7) is different from a standard zero-one IP problem formulation due to the existence of (6). However, it can be shown that the optimality conditions still apply. To see this, one can introduce an additional set of multipliers μs for the local constraints (one for each constraint in (6)) to obtain an IP formulation for (x, μ) jointly.

Given a set of Lagrangian multipliers, λ, the maximization problem in (5) can be decomposed into independent sub-problems, one for each user i.

$$\max_{x_{i,j}} \sum_{j=1}^{M} p_{i,j} x_{i,j} - \sum_{k=1}^{K} \lambda_k \sum_{j=1}^{M} b_{i,j,k} x_{i,j} \quad (11)$$

$$\text{s.t.} \sum_{j=1}^{M} c_{i,j,l} x_{i,j} \leq C_l, \forall l \in \{1, \ldots, L\} \quad (12)$$

$$x_{i,j} \in \{0, 1\}, \forall j \in \{1, \ldots, M\} \quad (13)$$

As the size of λ is relatively small, it is feasible to solve each subproblem (11)-(13) by any commercially available IP solvers such as CPLEX or GUROBI on a single machine.

A distributed computing framework can be used for the process of decomposing the large-scale KPs into many sub-problems of the same form (11)-(13) followed by solving each sub-problem independently. In some embodiments, the process can be implemented using the MapReduce, MPI, HADOOP, SPARK, or any other distributed computing frameworks or models. In the following, MapReduce semantics are used as an example to describe the algorithm. The described techniques can be used in other distributed computing framework or models.

FIG. 1 is a diagram illustrating an example of a distributed computing system 100 for solving a KP with an information flow, in accordance with embodiments of this specification. The distributed computing system 100 (or the distributed framework 100) for solving KPs uses a MapReduce computing model as an example. In some other embodiments, the distributed computing system 100 can be implemented using the MPI, HADOOP, SPARK, or any other distributed computing frameworks or models.

The distributed computing system 100 includes multiple IP solvers (also referred to as mappers) 110, multiple aggregators (also referred to as reducers) 120, a dual multiplier updater (also referred to as a master node) 130. The IP solvers 110 can be, for example, commercially available or off-the-shelf IP solvers such as CPLEX or GUROBI or a customized IP solver such as a hierarchical greedy IP solver, as described in more detail below. The multiple IP solvers are distributed among multiple data processing apparatuses in the distributed computing system 100. For example, each IP solver can be run by a single processing core of a computer. In some embodiments, the multiple IP solvers are implemented by a computing cluster or a cloud computing system. The IP solvers 110 can receive user data 140. For example, in the subproblem (11)-(13), the user data 140 for user i can include $p_i$, $b_i$ and $c_i$. For example, each IP solver 110 can solve the subproblem (11)-(13) s.t. to local constraints.

In some embodiments, an iterative algorithm is employed to solve for the (x, λ) pair. In each iteration, the solution $x_{i,j}$ for (11) is computed by the IP solvers 110, which then emit K values, $\Sigma_{j=1}^{M} b_{i,j,k} x_{i,j}, k=1, K$, corresponding to the knapsack resources consumed by user i. The reducers 120 aggregate the total resources consumed for each knapsack, $\Sigma_{i=1}^{N} \Sigma_{j=1}^{N} b_{i,j,k} x_{i,j}$.

The master node 130 can update Lagrangian multipliers λ according to one or more updating rules or algorithms, for example, based on slacks, $B_k - \Sigma_{i=1}^{N} \Sigma_{j=1}^{N} b_{i,j,k} x_{i,j}$. For example, one way to update $\lambda_k$ is to apply the dual descent (DD) algorithm. For example, for the (t+1)-th iteration, $$\lambda_k^{t+1} = \max(\lambda_k^t + \alpha(\Sigma_{i=1}^{N} \Sigma_{j=1}^{N} b_{i,j,k} x_{i,j} - B_k), 0) \quad (14)$$

where the hyper-parameter α is the learning rate.

In some embodiments, the master node 130 can update Lagrangian multipliers λ according to a synchronous coordinate descent (SCD) algorithm, as described in more detail below, or other algorithms.

In some embodiments, given the Lagrangian multipliers λ, each of the IP solvers 110 can re-solve Eqs. (11)-(13) for decision variables $\{x_{i,j}\}$ for each user i. The decision variables can be returned as decisions for all users 150. For example, $x_{i,j}$ can indicate whether an item j (e.g., a certain coupon from HUABEI) will be offered to user i. In some embodiments, the decision variables $\{x_{i,j}\}$ can be stored and fetched to serve live traffic. For example, if user i is in production (e.g., when user i pays using Alipay APP or visits a certain page of Alipay APP), the platform (e.g., the Alipay APP) can offer the item j to the user i according to the computed decision variable $x_{i,j}$ for the user i.

FIG. 2 is a pseudocode 200 of an example of a MapReduce algorithm 250 (also referred to as Algorithm 1) for solving knapsack problems, in accordance with embodiments of this specification. In some embodiments, the MapReduce algorithm 250 can include T iterations. Within each iteration t, at 252, a mapper can execute a respective Map function (e.g., as defined and annotated as 210) for each user. Each Map function returns k values related to the K global constraints or K knapsacks, respectively. In some embodiments, N mappers can execute respective Map functions for respective users in parallel.

At 254, for each of the K knapsacks, the total resource consumed by the N users for each knapsack, $\Sigma_{i=1}^{N} \Sigma_{j=1}^{N} b_{i,j,k} x_{i,j}$, can be computed by a Reduce function (e.g., as defined and annotated as 220). In some embodiments, K reducers can execute respective Reduce functions for respective knapsacks in parallel.

At 256, the MapReduce algorithm 250 uses dual descent (DD) as the λ updating rule, for example, according to the techniques described w.r.t. Eq. (14). At 258, the MapReduce algorithm 250 terminates and returns λ if λ has converged or after a maximum number of T iterations. In some embodiments, λ can be regarded as converged, for example, if the difference of λ between two iterations is less than a threshold.

Given λ computed by Algorithm 1 as shown in the pseudocode 200, Eqs. (11)-(13) can be re-solved. The decision variables $\{x_{i,j}\}$ for the users can be returned, for example, as decisions for all users 150.

In real-world applications, local constraints often demonstrate nested hierarchical structures, as resources are often organized as nested users (e.g., a taxonomy).

As an illustrative example, consider a simplistic marketing campaign where there are 10 offers in total, 5 from platform A and 5 from platform B; a user is required to be exposed to no more than 2 offers from either platform A or platform B and no more than 3 in total.

The local constraints in this example can be expressed as follows:

$$\Sigma_{j=1}^{5} x_{i,j} \leq 2, \forall i \in \{1, \ldots, N\} \quad (15)$$

$$\Sigma_{j=6}^{10} x_{i,j} \leq 2, \forall i \in \{1, \ldots, N\} \quad (16)$$

$$\Sigma_{j=1}^{10} x_{i,j} \leq 3, \forall i \in \{1, \ldots, N\} \quad (17)$$

In this example, local constraints are structured as a 2-level tree. In practice, the structure can be represented as a directed acyclic graph (DAG). Some may present much more complex hierarchies. A DAG is a finite directed graph with no directed cycles. Equivalently, a DAG is a directed graph that has a topological ordering, a sequence of the vertices such that every edge is directed from earlier to later in the sequence. A topological ordering of a directed graph is a linear ordering of its vertices such that for every directed edge uv from vertex u to vertex v, u comes before v in the ordering. In some embodiments, the vertices of the graph may represent tasks to be performed, and the edges may represent constraints that one task must be performed before another. In this case, a topological ordering is a valid sequence for the tasks. A topological ordering is possible if and only if the graph has no directed cycles, that is, if it is a DAG. Any DAG has at least one topological ordering. A topological ordering of any DAG can be constructed by known algorithms.

For local constraint l, denote its resource index set by S(l), that is, $S(l) = \{j : c_{i,j,l} = 1\}$. A knapsack problem is considered to have a hierarchical local constraint structure for user i when the following conditions hold:

$$c_{i,j,l} \in \{0,1\}, \forall j \in \{1, \ldots, M\}, \forall l \in \{1, \ldots, L\},$$

and $$S(l) \cup S(l') = \emptyset \text{ or } S(l) \subseteq S(l') \text{ or } S(l) \supseteq S(l'), \forall l, l'.$$

The resource index sets are non-overlapping unless one is a subset of another. In some embodiments, a DAG can be constructed for the M resource index sets such that there is an arc from S(l) to S(l') if and only if $S(l) \subseteq S(l')$.

Figure 3:
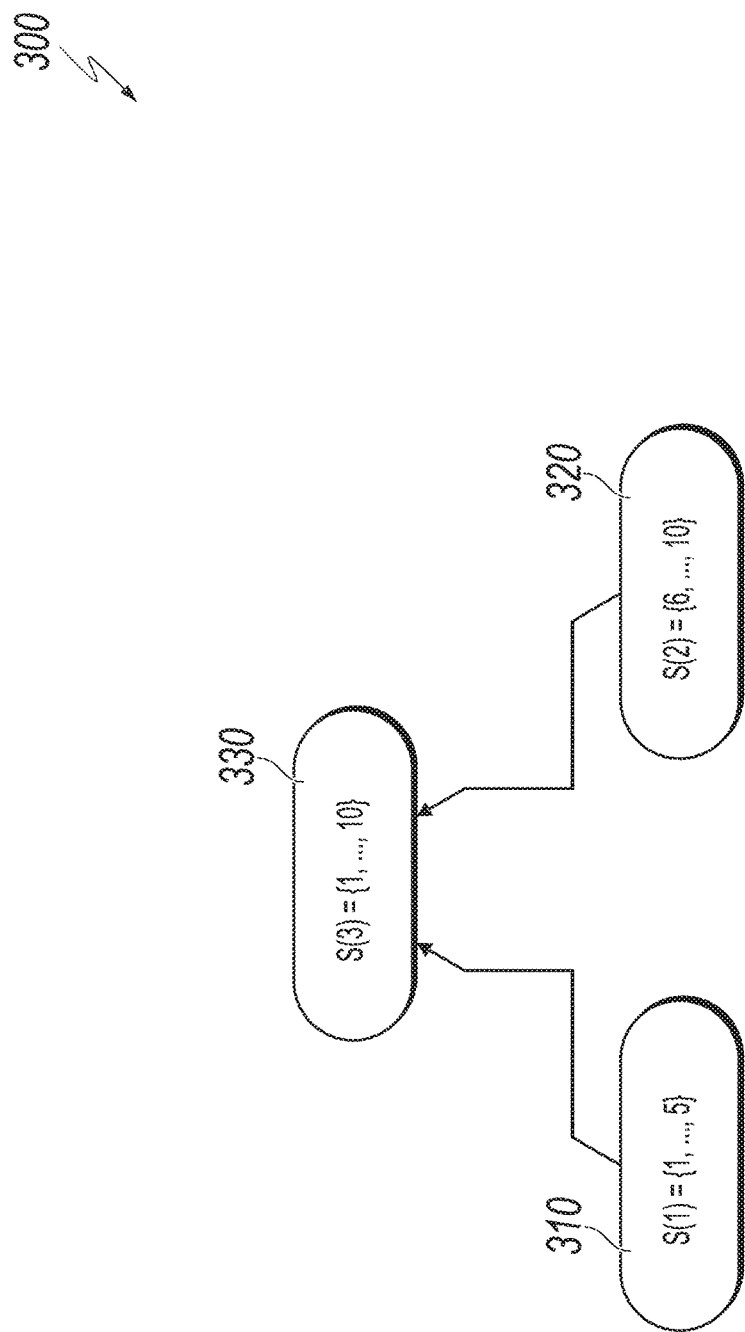
FIG. 3 is a diagram illustrating an example of a directed acyclic graph (DAG) of resource index sets for local constraints in (15) to (17), respectively, in accordance with embodiments of this specification.

FIG. 3 is a diagram illustrating an example of a directed acyclic graph (DAG) 300 of resource index sets 310, 320, and 330 for local constraints in (15) to (17), respectively, in accordance with embodiments of this specification. The resource index set 310 for local constraint in (15) includes resource indices 1~5; the resource index set 320 for local constraint in (16) includes resource indices 6-10; and the resource index set 330 for local constraint in (17) includes resource indices 1-10. As illustrated, the resource index set 310 and the resource index set 320 have no common index. Each of the resource index set 310 and the resource index set 320 is a subset of the resource index set 330.

FIG. 4 is a pseudocode of an example of a greedy algorithm (referred to as Algorithm 2) 400 for solving an IP problem subject to constraints with a hierarchical structure, in accordance with embodiments of this specification. The example of the greedy algorithm 400 can be used to solve an IP problem under hierarchical local constraints. For example, the optimization problem (11)-(13) for user i can be solved efficiently by the greedy algorithm that traverses the DAG in a topological order. A solver configured to implement the example of the greedy algorithm 400 can be referred to as a hierarchical greedy IP solver. For example, a hierarchical greedy IP solver can compute decision variables for each user given the dual multipliers λ.

The greedy algorithm 400 initially chooses all the resources at 410, for example, by marking decision variables of $x_{i,j}$ of all resources as 1. At 420, the resource index j is sorted in a non-increasing order based on a cost-adjusted reward (which is also the contributing dual value of $x_{i,j}$), $$\tilde{p}_{i,j} = p_{i,j} - \Sigma_{k=1}^{K} \lambda_k b_{i,j,k}.$$

At 430, the resource index sets {S(l)} are traversed in a topological order of the DAG, for example, by starting at the lowest level of the DAG. For each S(l), at 440, the previously selected resources (i.e., resources with corresponding decision variable $x_{i,j}=1$) are fetched in a non-decreasing order of the cost-adjusted reward until their sum exceeds the local constraint $C_l$. In some embodiments, it is equivalent to selecting the $C_l$ resources with decision variable $x_{i,j}=1$ and having the top cost-adjusted reward in the resource index set S(l). The remaining resources in the non-decreasing order of the cost-adjusted reward are thus left un-selected or unchosen.

At 450, the $x_{i,j}$ values for the unchosen resources within S(l) are all marked as 0 and will not be considered anymore in the following iterations. This greedy selection process is repeated until all the nodes in the DAG have been traversed. At 460, the decision variables $x_{i,j}$ are output.

As an example, as shown in FIG. 3, the resource index set 310 for local constraint in (15) (here $C_1=2$), the top $C_1=2$ resources (say, resources 2 and 4) among the resources 1~5 sorted in the non-decreasing order of their respective cost-adjusted reward are selected. The decision variables of the non-selected resources (i.e., resources 1, 3, and 5 in this example) in resource index set 310 are marked as 0 and will not be considered again. Similarly, the resource index set 320 for local constraint in (16) (here $C_2=2$), the top $C_2=2$ resources (say, resources 6 and 9) among the resources 6~10 sorted in the non-decreasing order of their respective cost-adjusted reward are selected. In some embodiments, the decision variables of the non-selected resources (i.e., resources 7, 8, and 10 in this example) in resource index set 320 are marked as 0 and will not be considered again.

For the resource index set 330 for local constraint in (17) (here $C_3=3$) which is on a next level of the hierarchy of the DAG 300, there are four previously resources 2, 4, 6 and 9 with decision variables marked as 1. The top $C_3=3$ resources (say resources 2, 6 and 9) among the four previously resources 2, 4, 6, and 9 sorted in the non-decreasing order of the cost-adjusted reward are selected. In some embodiments, the decision variables of the rest resources (i.e., resource 4 in this example) in resource index set 330 is marked as 0. In this example, the DAG 300 has been fully traversed and the top three resources (i.e., resources 2, 6, and 9) are output as the selected resources.

The greedy algorithm, which has a polynomial time complexity, can optimally solve the maximization problem (11)-(13). A proof of optimality is as follows. Given any other solution (denoted by $\tilde{x}_{i,j}$, j=1, ..., M) that satisfies the constraints (12) and (13) but differs from the greedy solution (denoted by $x^*_{i,j}$, j=1, ..., M), the first node in the topological order of the DAG can be identified at which the resources chosen are different. Due to the nature of the greedy algorithm, there must exist a pair of resources j and at the node where the adjusted reward of resource j is no less than that of resource j', but $x^*_{i,j}=1$, $x^*_{i,j'}=0$, $\tilde{x}_{i,j}=0$, $x_{i,j'}=1$. $\tilde{x}$ can be modified by setting $\tilde{x}_{i,j}=1$, $\tilde{x}_{i,j'}=0$ without decreasing the objective value of (11). All the constraints (12) and (13) are still satisfied, because any later node in the topological order of the DAG contains both j and j' or neither. In this way, any solution to the greedy solution can be converted without decreasing the objective value or violating any constraint. This completes the proof.

In some embodiments, with the decision variables solved, for example, by Algorithm 2 or any other algorithms for solving an IP problem, a synchronous coordinate descent (SCD) algorithm can be used to update the dual multipliers λ.

In some embodiments, for a given set of multipliers λ, Algorithm 2 depends on the relative order of the cost-adjusted rewards, $\tilde{p}_{i,j}$, without the need of knowing their actual values. This property allows an efficient algorithm to update $\lambda_k$ satisfying the conditions (8) to (10), while holding other multipliers ($\lambda_{k'}$ with k'≠k) fixed. The algorithm can take advantage of the fact that, among all non-negative values of new $\lambda_k$, the relative order of can potentially change only at the pair-wise intersection points of the M linear functions $f_j(\lambda_k)$ of $\lambda_k$, or at their intersection points (if any) with the horizontal axis. The M linear functions $f_j(\lambda_k)$ can be, for example, the cost-adjusted rewards ($p_{i,j} - \Sigma_{k'=1,k'\neq k}^{K} \lambda_K b_{i,j,k'}$) for j=1, ..., M or other variations of objective functions of the dual problem in (11) as a function of $\lambda_k$.

Figure 5:
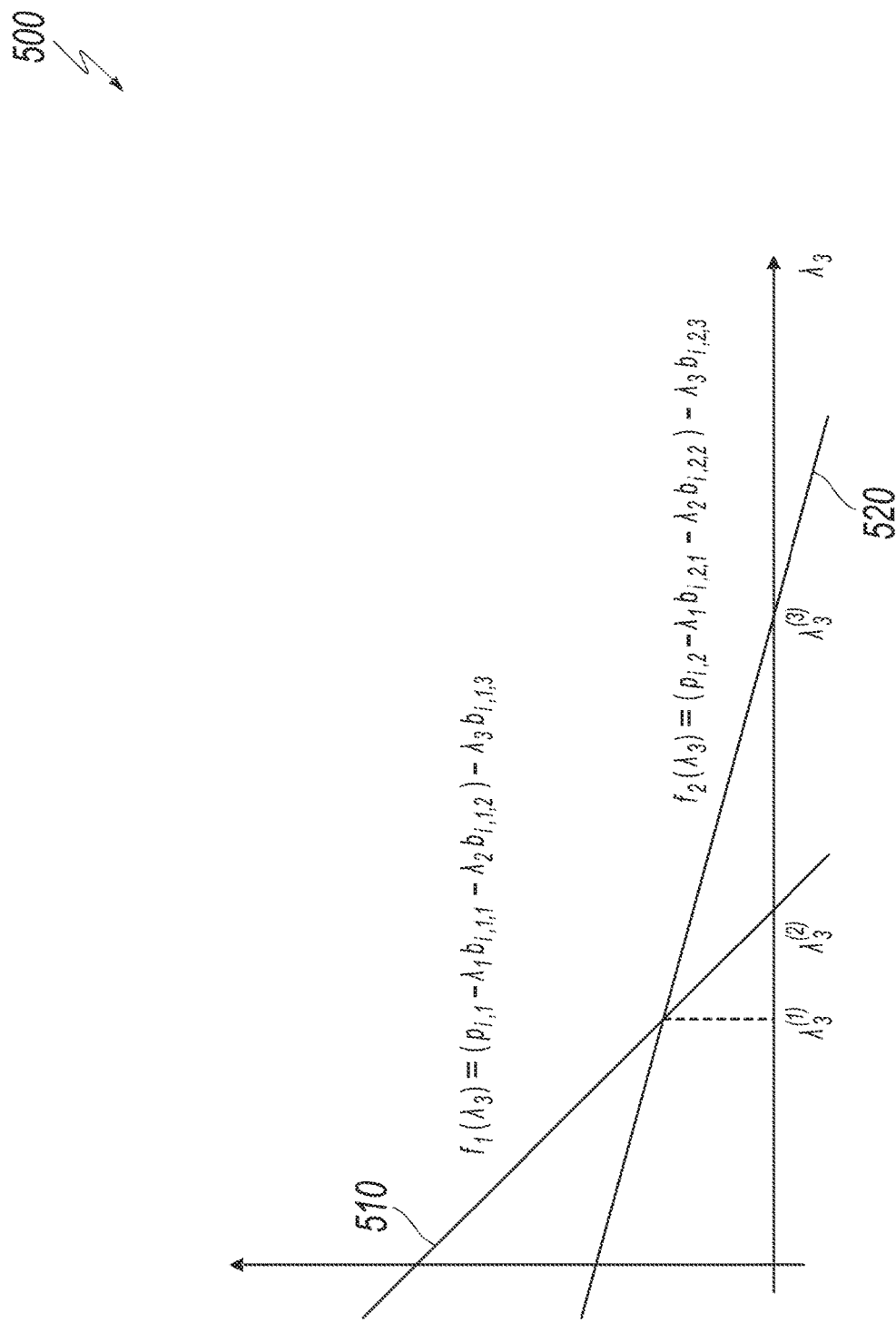
FIG. 5 is a plot illustrating examples of candidates of a dual multipliers $\lambda_3$ for user i, in accordance with embodiments of this specification.

FIG. 5 is a plot 500 illustrating examples of candidates of a dual multiplier $\lambda_3$ for a user i, in accordance with embodiments of this specification. Assuming that M=2 and K=3, and an example of a local constraint is:

$$x_{i,1} + x_{i,2} \leq 1.$$

FIG. 5 shows M=2 linear functions 510 and 520 and three new multiplier candidates $\{\lambda_3^{(1)}, \lambda_3^{(2)}, \lambda_3^{(3)}\}$ that could affect the optimization outcome of (11) for the user i. In particular, $\lambda_3^{(1)}$ is the value of $\lambda_3$ at the pair-wise intersection point of the linear functions 510 and 520; $\lambda_3^{(2)}$ is the value of $\lambda_3$ at the pair-wise intersection point of the linear function 510 and the horizontal axis; and $\lambda_3^{(3)}$ is the value of $\lambda_3$ at the pair-wise intersection point of the linear function 520 and the horizontal axis.

$$\begin{cases} x_{i,1}=0, x_{i,2}=0, & \text{if new } \lambda_3 \in (\lambda_3^{(3)}, +\infty), \\ x_{i,1}=0, x_{i,2}=1, & \text{if new } \lambda_3 \in (\lambda_3^{(1)}, \lambda_3^{(3)}], \\ x_{i,1}=1, x_{i,2}=0, & \text{if new } \lambda_3 \in [0, \lambda_3^{(1)}]. \end{cases}$$

This example also shows that it is not necessarily true that the optimization outcome of (11)-(13) will change at all intersection points. For example, here the maximizers do not change at $\lambda_3^{(2)}$.

FIG. 6 is a pseudocode of an example of an algorithm for computing candidate dual multipliers (also referred to as Algorithm 3) 600, in accordance with embodiments of this specification. In some embodiments, the algorithm 600 can be used to compute all candidate new dual multipliers $\lambda_k$ for user i. Specifically, the algorithm 600 includes a function CalculateIntersectionPoints 650 that can compute the intersection points of M linear functions of $\lambda_k$ (e.g., the objective functions of the dual problem in (11) as a function of $\lambda_k$) or their intersection points (if any) with the horizontal axis. For example, as shown in FIG. 6, a function Intersect($f(\lambda_k)$, $g(\lambda_k)$) 610 is used to return non-negative intersection points of $f(\lambda_k)$ and $g(\lambda_k) \geq 0$, when $f(\lambda_k)$ and $g(\lambda_k)$ are not parallel. For each of the M linear functions of $\lambda_k$, its intersection points with the other (M−1) linear functions of $\lambda_k$ and the horizontal axis are computed and saved in a set $\Lambda_k$. Non-duplicate values in the set $\Lambda_k$ can be returned as the candidate new dual multipliers $\lambda_k$ for user i.

Given all candidates of new $\lambda_k$ for each user, a coordinate descent algorithm that takes into account all users and computes an updated $\lambda_k$ satisfying the conditions (8)-(10), while having other multipliers fixed.

FIG. 7 is a pseudocode 700 of an example of a synchronous coordinate descent (SCD) algorithm (also referred to as Algorithm 4) 750 with a MapReduce model for solving a KP, in accordance with embodiments of this specification. The synchronous coordinate descent algorithm 750 can include T iterations to execute Map and Reduce steps iteratively. Within each iteration t, in the Map step at 752, a mapper can execute a respective Map function (e.g., as defined and annotated as 710) for each user, for example, to solve the IP sub-problems (14)-(16) independently. In some embodiments, N mappers can execute respective Map functions in parallel. In the Reduce step at 754, every $\lambda_k$ is updated by having other dual multipliers $\lambda_{k'}(k' \neq k)$ fixed. In some embodiments, K reducers can execute respective Reduce functions in parallel.

Specifically, according to the Map function 710, for each user i, at 712, the mapper obtains candidates of new Lagrangian multipliers $\lambda_k$ according to the function CalculateIntersectionPoints 650 as defined in Algorithm 3 in FIG. 6. At 714, the mapper sorts the candidates of new $\lambda_k$ in a decreasing order. At 715, the mapper goes through all candidates of Lagrangian multipliers $\lambda_k$ and calculates decision variables $\{x_{i,j}\}$ by solving Eqs. (11)-(13), for example, according to Algorithm 2 as described w.r.t. to FIG. 4. In some embodiments, given A, the decision variables $\{x_{i,j}\}$ can be calculated by solving Eqs. (11)-(13), for example, according to any suitable algorithms of an IP solver. At 716, the mapper calculates the amount of resources that would be used in the k-th knapsack if updating $\lambda_k$ to the corresponding new value. Typically, the amount of used resources increases as $\lambda_k$ decreases. At 718, the mapper emits only the incremental amount of used resources as $\lambda_k$ decreases. In some embodiments, an advantage of using the incremental amount, rather than the total amount, is to allow summing over all emitted or returned $v_2$ with $v_2 \geq v$ in order to determine the threshold v as done in Reduce function 720 of FIG. 7. If the total amount is emitted, there could be more than one $v_1$ that corresponds to the same user, and assuming (without loss of generality) that at most one item is allowed per user, additional booking (that means more storage and computation) may be needed to make sure that no double counting of the consumption by that user.

Figure 13:
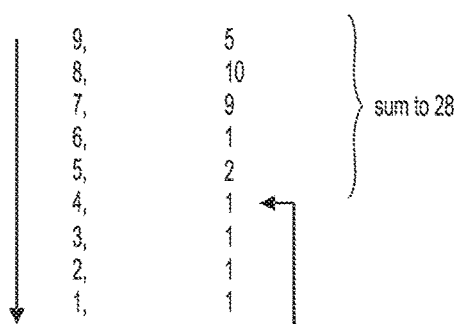
FIG. 13 is a plot illustrating an example of an execution result of the Map function 710 and Reduce function 720 for solving a KP, in accordance with embodiments of this specification.

At 754, for each of the K knapsacks, a Reduce function (e.g., as defined and annotated as 720) aggregates the emitted results for the same key (i.e., the knapsack index k) among all users and calculates the updated $\lambda_k$ to be the minimal threshold v such that the total resources used for the k-th knapsack among all users does not exceed $B_k$ at 722. In some embodiments, all candidates of $\lambda_k$ among all users can be sorted in a non-increasing order. The reducer can compute the total resources used for the k-th knapsack among all users for a given $\lambda_k^{(s)}$ by summing the incremental amounts of used resources corresponding to all candidates of $\lambda_k$ that are no less than $\Delta_k^{(s)}$. The value of the minimal threshold v can be determined such that total resources used for the k-th knapsack among all users for any given candidate $\lambda_k^{(s)} \geq v$ does not exceed $B_k$, whereas total resources used for the k-th knapsack among all users for any given candidate $\lambda_k^{(s)} < v$ exceeds $B_k$. In some embodiments, the value of the minimal threshold v may not be one of the candidates of $\lambda_k$. In some embodiments, interpolation can be performed in finding the minimal threshold v candidates of $\lambda_k$, for example, according to an example described w.r.t. FIG. 13 below.

The summation as done in the Reduce function 720 properly calculates the total resources used by the users for a chosen threshold v, because the mapper emits only the incremental amount of resources used as $\lambda_k$ decreases. In some embodiments, K reducers can execute respective Reduce functions for respective knapsacks in parallel.

FIG. 13 is a plot 1300 illustrating an example of an execution result of the Map function 710 and Reduce function 720 for solving a KP, in accordance with embodiments of this specification. In the example, N=3 users are considered. For each of the 3 users, the Map function 710 can be executed, for example, in parallel by respective IP solvers. Assume the k-th global constraint corresponding to the k-th knapsack where k=3 and $B_k$=28, each user can solve their respective IP problem and obtain their respective candidates of $\lambda_3$ according to the Map function 710 using the techniques described with respect to FIGS. 5-7. Box 1310 shows execution results of the Map function 710 for each of the three users. For example, as shown in 1311 for User 1, three candidates of $\lambda_3$ (denoted as $v_1$ in the Map function 710) in a decreasing order are 9, 6, and 3, respectively. The total amounts of resources that would be used in k-th knapsack given the three candidates of $\lambda_3$ are 5, 6, and 7, respectively. According to 718, the Mapper function 710 emits only the incremental amount of used resources (denoted as $v_2$ in the Map function 710) as $\lambda_k$ decreases, which are 5, 6−5=1, and 7−6=1, respectively. The emitted output (k, [$v_1$, $v_2$]) for User 1 are thus (3, [9, 5]), (3, [6, 1]), and (3, [3, 1]), respectively.

As shown in 1312 for User 2, three candidates of $\lambda_3$ (denoted as $v_1$ in the Map function 710) in a decreasing order are 8, 5, and 2, respectively. The total amounts of resources that would be used in k-th knapsack given the three candidates of $\lambda_3$ are 10, 12, and 13, respectively. According to 718, the Map function 710 emits only the incremental amount of used resources (denoted as $v_2$ in the Map function 710) as $\lambda_k$ decreases, which are 10, 12−10=2, and 13−12=1, respectively. The emitted output (k, [$v_1$, $v_2$]) for User 2 are thus (3, [8, 10]), (3, [5, 2]), and (3, [2, 1]), respectively.

As shown in 1313 for User 3, three candidates of $\lambda_3$ (denoted as $v_1$ in the Map function 710) in a decreasing order are 7, 4, and 1, respectively. The total amounts of resources that would be used in k-th knapsack given the three candidates of $\lambda_3$ are 9, 10, and 11, respectively. According to 718, the Mapper function 710 emits only the incremental amount of used resources (denoted as $v_2$ in the Map function 710) as $\lambda_k$ decreases, which are 9, 10−9=1, and 11−10=1, respectively. The emitted output (k, [$v_1$, $v_2$]) for User 3 are thus (3, [7, 9]), (3, [4, 1]), and (3, [1, 1]), respectively.

Box 1320 shows an execution result of the Reduce function 720 for all the three users for the kth global constraint corresponding to the kth knapsack where k=3. In some embodiments, all the candidates of $\lambda_3$ across all users can be sorted, for example, in a non-increasing order, as shown as [9, 8, 7, 6, 5, 4, 3, 2, and 1] with their respective incremental used resources [5, 10, 9, 1, 2, 1, 1, 1, and 1]. In this example, given $B_k$=28, it is determined that the total amount of resources corresponding to $\lambda_3$=4 equals 28. The total amount of resources corresponding to $\lambda_3$=4 can be computed by summing the respective incremental used resources (e.g., [5, 10, 9, 1, 2, 1]) for all candidates of $\lambda_3$ that are larger than or equal to 4 (e.g., [9, 8, 7, 6, 5, 4]) together. It can also be determined that the total amount of resources corresponding to any $\lambda_3<4$ would exceed $B_k=28$. For example, the total amount of resources corresponding to $\lambda_3=3$ can be 29, which can be computed by summing the respective incremental used resources (e.g., [5, 10, 9, 1, 2, 1, 1]) for all candidates of $\lambda_3$ that are larger than or equal to 3 (e.g., [9, 8, 7, 6, 5, 4, 3]) together. In this example, the minimal threshold v is determined to be 4. As can be updated to be v=4.

In some embodiments, if $B_k=28.5$, then interpolation can be performed to determine the minimal threshold v. For example, given the total amount of resources corresponding to $\lambda_3=4$ being 28 and the total amount of resources corresponding to $\lambda_3=3$ being 29, the minimal threshold v can be determined to be 3.5 by interpolating the two values of $\lambda_3$ to determine the minimal threshold v of $\lambda_3$ such that a total amount of resources corresponding to the minimal threshold v of $\lambda_3$ does not exceed $B_k=28.5$. In some embodiments, other techniques can be used to compute the minimal threshold v.

Referring back to FIG. 7, the process for updating $\lambda$ can be repeated for a maximum number of T iterations, and terminates early if $\lambda$ has reached convergence. For example, at 756, the coordinate descent algorithm 750 terminates and returns $\lambda$ if $\lambda$ has converged or after a maximum number of T iterations.

Given $\lambda$ computed by Algorithm 1 as shown in the coordinate descent algorithm 750, Eqs. (11)-(13) can be re-solved. The decision variables $\{x_{i,j}\}$ for the users can be returned, for example, as decisions for all users 150.

Although the coordinate descent algorithm 750 uses a synchronous coordinate descent that updates $\lambda_k$ for all k=1, . . . , K simultaneously. Other variants of coordinate descent, such as a cyclic coordinate descent that updates one multiplier at a time, and a block coordinate descent that updates multiple multipliers in parallel, are also applicable. In our system, all the aforementioned algorithms are supported.

For the special case of K=1, it can be shown that Algorithm 4 will converge to a solution with a total reward that is at most $\max_{i,j} p_{i,j}$ less than that of the optimal solution, since the algorithm essentially produces a rounded integer solution after solving a fractional knapsack problem. For more general cases, it can be shown empirically that the solution computed by Algorithm 4 is nearly optimal for the class of problem instances.

The Map function in coordinate descent algorithm 750 has a time complexity of $O(KM^3 \log M)$, given M resources per user and K global constraints. This complexity can be significantly reduced in some real-world cases where there exists a one-to-one mapping between the resources and the knapsacks (i.e., M=K, and $b_{i,j,k}=0$, $\forall j, k$), and there is a single local constraint limiting the maximum number (denoted by Q thereafter) of resources chosen for each user.

For such cases, there is at most one candidate of new $\lambda_k$ that determines whether the k-th resource has a top Q adjusted reward or not. Specifically, if the adjusted reward of resource k is already in top Q, the critical value of new $\lambda_k$ is the one that lowers its adjusted reward to the (Q+1)-th adjusted reward. If the adjusted reward of resource k is not in top Q, the critical value of new $\lambda_k$ is the one that increases its adjusted reward to the Q-th adjusted reward.

FIG. 8 is a pseudocode 800 of an example of a Map function for choosing up to a maximum number (denoted by Q) of resources for each user (also referred to as Algorithm 5) 850, in accordance with embodiments of this specification. As shown in FIG. 8, $\bar{p}$ is the threshold deciding whether the k-th resource will be chosen for user i. If new $\lambda_k$ is larger than $$\frac{p_{i,k} - \bar{p}}{b_{i,k,k}},$$

the updated adjusted reward of the k-th resource will be below $\bar{p}$ and thus will not be chosen. On the other hand, a new $\lambda_k$ below $$\frac{p_{i,k} - \bar{p}}{b_{i,k,k}}$$

guarantees that the resulting adjusted reward of the k-th resource is among top Q across all resources. Thus, Algorithm 5 correctly emits the only candidate of new $\lambda_k$ (if any) that determines whether the k-th resource has a top Q adjusted reward or not.

Algorithm 5 uses quick_select(array, n), an algorithm that returns the n-th largest element of an array of length K in a time complexity of O(K). The overall time complexity of Algorithm 5 is then O(K), independent of the value of Q.

To further accelerate the convergence of the algorithm when scaling it up to solve billion-scale problems, additional algorithms have been developed, which have proven to be effective.

As an example, fine-tuned bucketing can be used to further speed up the convergence of the algorithm for solving billion-scale problems. A straightforward implementation of the Reduce function in Algorithm 4, as shown in FIG. 7, is to sort the emitted results by the value of $v_1$ and choose the minimal threshold v based on the sorted results. One way to speed up is to bucket the values of $v_1$ and calculate the sum of $v_2$ for each bucket. Then the target bucket that the threshold v falls into can be identified and the value of v can be approximated, for example, by interpolating within the bucket.

To improve the accuracy of the above approximation through bucketing and interpolating, in some embodiments, the bucket size can be designed to be small around the true value of v and large when the bucket is unlikely to contain v. Unfortunately, the true value of v is unknown beforehand. Nevertheless, due to the iterative nature of Algorithm 4, the value calculated in the previous iteration, i.e., $\lambda_k^t$, provides a reasonable estimate for $v=\lambda_k^{t+1}$. Thus an uneven bucketing scheme can be designed such that the bucket is of a smaller or minimal size around $\lambda_k^t$ and grows (e.g., exponentially or in another manner) as it deviates from $\lambda_k^t$. As an example, given the value calculated in the previous iteration $\lambda_k^t$, the bucket id assigned to a candidate $\lambda_k$ is given as:

$$\text{bucket\_id}(\lambda_k) = \text{sign}(\lambda_k - \lambda_k^t) \left\lfloor \log \frac{|\lambda_k - \lambda_k^t|}{\Delta} \right\rfloor$$

where $\Delta$ is a parameter controlling bucket sizes. Additional or different uneven bucketing scheme can be used.

Like all other iterative algorithms, starting from a good initialization can significantly accelerate the convergence of the algorithm. In some embodiments, the starting point of the dual multipliers, $\lambda^0$ in Algorithm 4, can be chosen randomly. In some embodiments, the starting point of the dual multipliers can be estimated by pre-solving using sampled data. For example, by sampling small sets of random users and adjusting knapsack budgets proportionally, Algorithm 4 can be started with better initialization. Experiments show that pre-solving can save up to 40% to 75% of iterations for large-scale KPs.

FIG. 9 is a pseudocode 900 of an example of a pre-solving by sampling algorithm (also referred to as Algorithm 6) 950, in accordance with embodiments of this specification. Additional or different pre-solving by sampling algorithm can be used in connection with the described algorithms for solving KP problems. The Algorithm 6 can include r iterations of pre-solving. In some embodiments, the r iterations of pre-solving can be done sequentially or in parallel. If run sequentially, the average of the λ values computed before the t-th iterations is used to reduce the running time further. As an example, with hundreds of millions of users, n=10,000 users can be sampled for each iteration of pre-solving.

With λ returned by Algorithm 4, the decision variables, $x_{i,j}$, for each user i can be computed. In some embodiments, the total resources used across all users may slightly violate the global constraints (2). In some embodiments, a lightweight post-processing method can be used to strictly ensure the feasibility of the global constraints and accelerate the convergence. The post-processing method can be based on the cost-adjusted user reward quantity, which is actually the contributing dual value of a given user i, $$\tilde{p}_i = \Sigma_{j=1}^M p_{i,j} x_{i,j} - \Sigma_{k=1}^K \lambda_k \Sigma_{j=1}^M b_{i,j,k} x_{i,j}.$$

In particular, the users are sorted in a non-decreasing order of $\tilde{p}_i$, and an entire user of decision variables $x_i$ can be reset as 0 until all global constraints are satisfied. Since the cost-adjusted user reward $\tilde{p}_i$ somehow measures the benefit of choosing some resources from user i, removing the resources with smaller values of $\tilde{p}_i$ is considered a sensible heuristic.

Both synthetic and real-world data have been used to test the various described algorithms for solving the KPs. For example, in the experiments, synthetic problems with N number of users and K global constraints, unless otherwise stated, $p_{i,j}$ is uniformly distributed in [0, 1]. Two classes of global constraints are considered:

dense: $b_{i,j,k}$ is uniformly distributed in [0, 1], and
sparse: M=K, and $b_{i,j,k}$ is uniformly distributed in [0, 1] if j=k and 0 otherwise.

The budgets of global constraints are set as modest values that scale with M, N, and L, which practically ensures tightness of constraints. Parameters for local constraints, $c_{i,j,l}$ and $C_l$, are all equal to 1.

In the following, optimality ratio is defined as the ratio of the primal objective value to the relaxed LP objective value; constraint violation ratio is defined as the ratio of the excessive budget to the given budget for a constraint, and we use the max constraint violation ratio over all the constraints to quantify overall violation.

To measure the quality of the KP solution produced by the described algorithm, a set of experiments are conducted to evaluate the optimality ratio between the KP solutions (computed by Algorithm 4 with post-processing method described above) against a relaxed LP solution.

Practically, it is difficult to find an existing LP solver that can compute the upper bounds for billion-scale KPs to compare against the described distributed solution. For ease of comparison, the optimality gap is shown on datasets with modest sizes that can be solved by existing LP tools. The relaxed LP problem is obtained by replacing binary constraints $x_{i,j} \in \{0, 1\}$ with $0 \leq x_{i,j} \leq 1$, $\forall i$, $\forall j$, and is solved using GOOGLE OR-tools.

Figure 10:
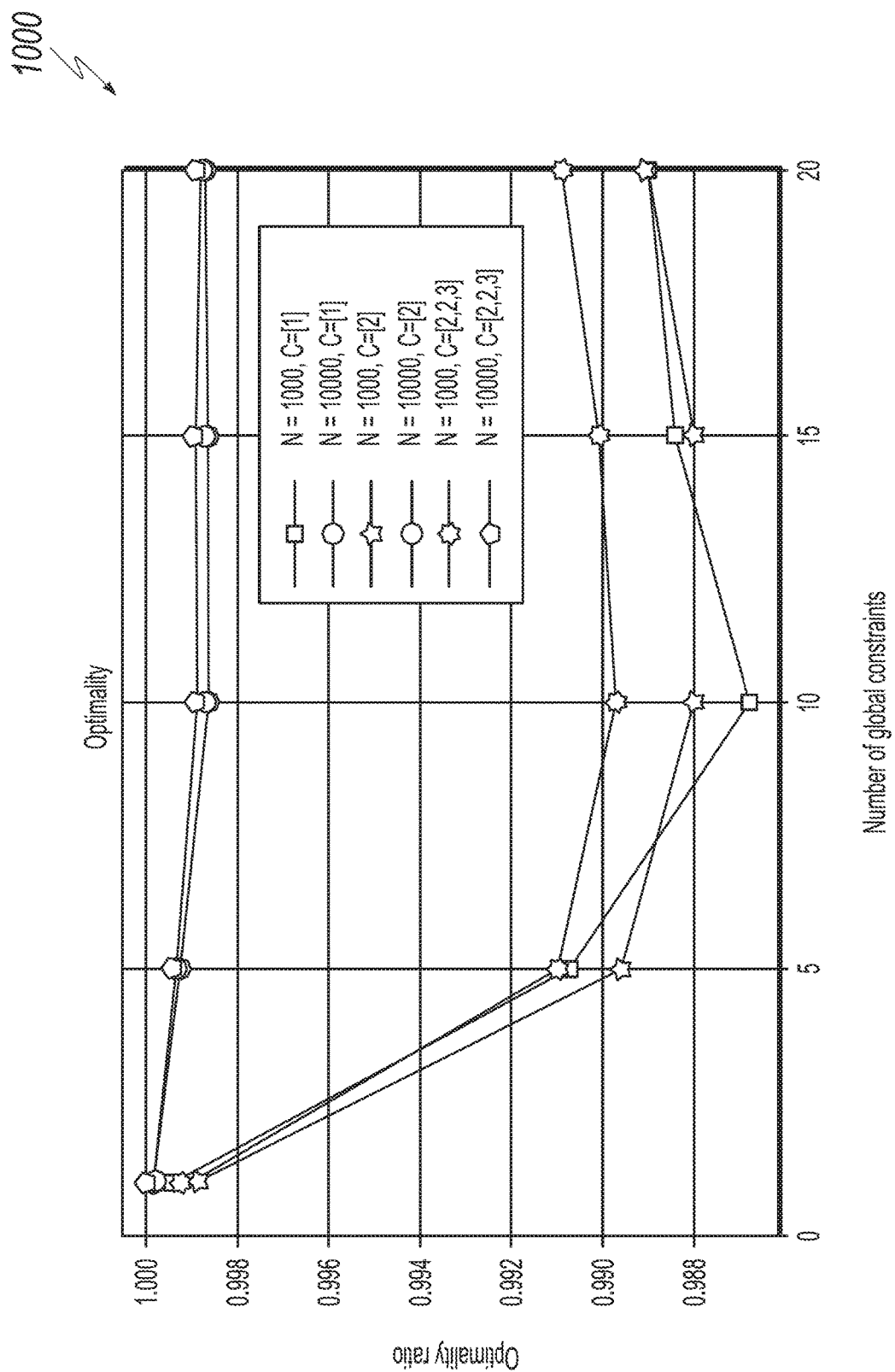
FIG. 10 is a plot showing examples of optimality gaps between KP solution using the described algorithm in FIG. 7 and upper bounds computed by linear programming (LP) relaxation, in accordance with embodiments of this specification.

FIG. 10 is a plot 1000 showing examples of optimality gaps between a KP solution using the described algorithm in FIG. 7 and upper bounds computed by LP relaxation, in accordance with embodiments of this specification. The KP solution is computed according to Algorithm 4 as shown in FIG. 7 with post-processing method described above. The plot 900 shows the optimality ratios for N=1,000, N=10,000 and K∈{1, 5, 10, 15, 20}. In this experiment, the number of resources per user M is fixed at 10. To increase the diversity of the resources, $b_{i,j,k}$ are uniformly distributed in [0, 1] with a probability of 0.5, and in [0, 10] with the remaining probability. The optimality ratios for three scenarios of local constraints have been evaluated and shown in FIG. 9 where
C=[1] means $\Sigma_{j=1}^M x_{i,j} \leq 1$,
C=[2] means $\Sigma_{j=1}^M x_{i,j} \leq 2$, and
C=[2,2,3] corresponds to hierarchical local constraints given by (15) to (17).

For each value of N and scenario of local constraints, the average optimality ratio (across 3 runs) are plotted in FIG. 10 as K varies. As shown in FIG. 10, the optimality gap decreases as N increases. The optimality ratio is above 98.6% for all experiment cases, and above 99.8% for N=10,000 under all scenarios of local constraints. The results in FIG. 10 support the intuition that when K<<N the KP solution computed by Algorithm 4 is nearly optimal.

When the number of users N is large, pre-solving with sampled users can be used to generate good starting points for λ. In an experiment, n=10,000 users are sampled for each iteration of pre-solving, and the computation time of pre-solving is negligible since n<<N. The number of SCD iterations until λ converges with pre-solving are compared against the number of iterations needed if always starting at $\lambda_k = 1.0$, $\forall k=1, \ldots, K$.

FIG. 11 is a table 1100 (also referred to as Table 1) illustrating examples of number of SCD iterations with and without pre-solving, in accordance with embodiments of this specification. Table 1 shows the number of SCD iterations for sparse problem instances with N=1 million, 10 million, 100 million. For each N, M=10 and K=10. The results in Table 1 show that pre-solving with sampled users reduced the number of SCD iterations by 40% to 75%.

On the other hand, pre-solving alone is not sufficient for solving the KP problem, as the λ produced by pre-solving may lead to constraint violations. When applying pre-solved λ to full datasets, it is observed that the number of global constraint violations are 4, 5, and 3 out of 10, for N=1 million, 10 million, 100 million, respectively, and the corresponding max constraint violation ratio is 2.5%, 4.1%, and 3.0%, respectively. However, the distributed SCD solutions have no violations. It is also worth noting that the primal objective value of the pre-solving solution, even with constraint violations, is always smaller than the distributed SCD solution.

FIG. 12 is a table 1200 (also referred to as Table 2) illustrating examples of experiment results of a distributed system using a SCD algorithm (e.g., Algorithm 4) on large-scale test data sets, in accordance with embodiments of this specification. The large-scale test data sets contain a number of sparse problem instances with N=100 million users, while the number of resources M in each user varies from 1 to 100 and thus the total number of resources considered is up to 10 billion. The solution quality and the running time are tested. Table 2 shows the number of SCD iterations, primal objective values, and duality gaps. The duality gaps are much smaller than the primal objective values, indicating that the solutions produced are nearly optimal. Furthermore, no global constraint is violated when Algorithm 4 terminates (i.e., all constraints are satisfied without any post-processing).

The running time of the system satisfied the business need of daily optimization and adjusting of the decision variables, for example, running with up to 1,000 CPUs in a shared APACHE HADOOP computing infrastructure (while the exact number of CPUs used is affected by the cluster load) the optimization for 1 billion decision variables and constraints was able to converge within about 1 hour of wall-clock time (exact wall-time varies due to hardware and workload).

Figure 14A:
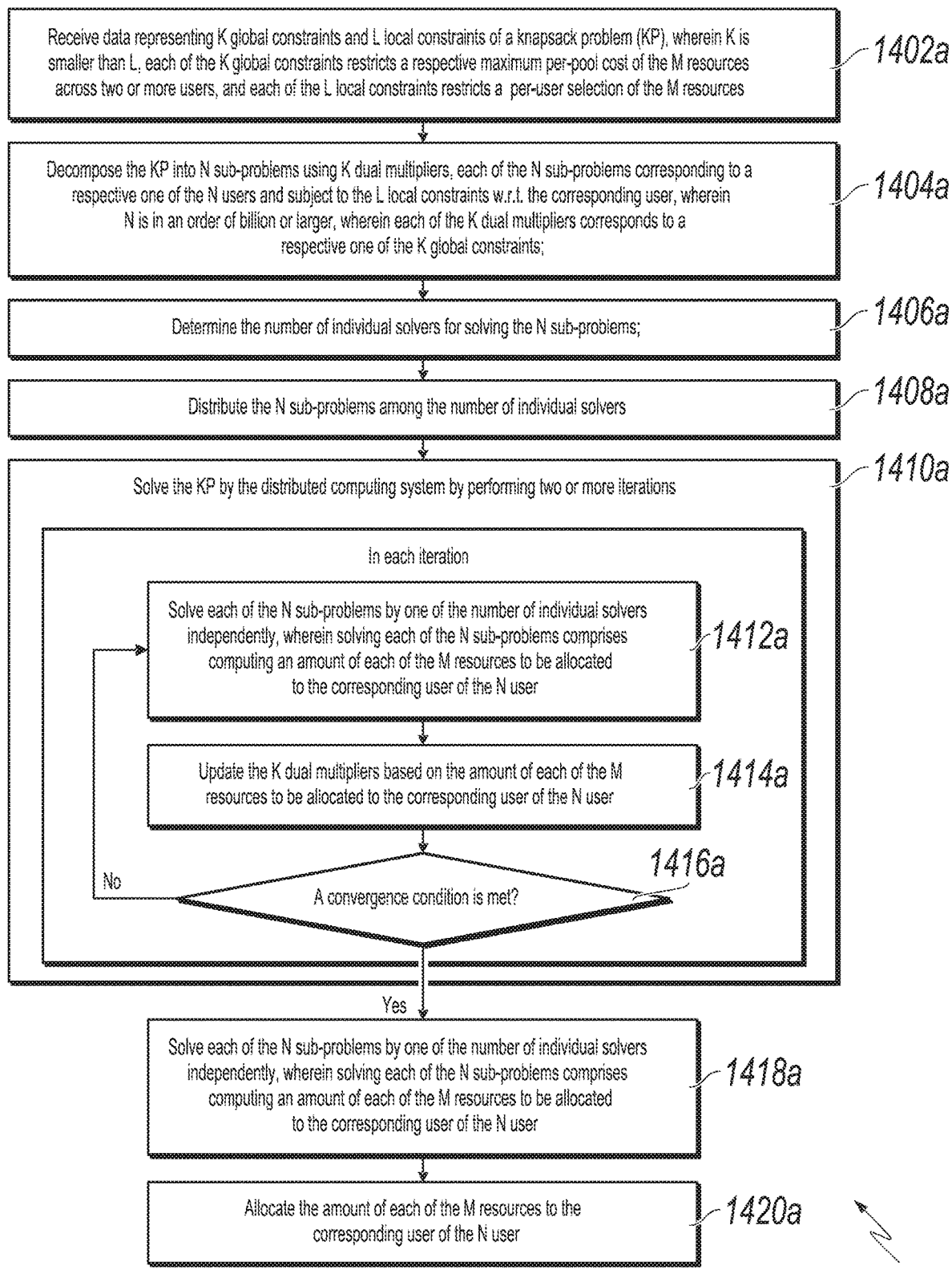
FIG. 14A is a flowchart of an example of a process for performing resource allocation of M resources among N users into K pools (e.g., K knapsacks) by solving a knapsack problem (KP), in accordance with embodiments of this specification.

FIG. 14A is a flowchart of an example of a process 1400a for performing resource allocation of M resources among N users into K pools (e.g., K knapsacks) by solving a knapsack problem (KP), in accordance with embodiments of this specification. The KP subject to K global constraints and L local constraints, for example, as represented in (1)-(4). Each pool can correspond to a respective knapsack as described in the KP. The KP can represent one or more real-world scenarios such as resource allocation including traffic routing/management, marketing campaign, product/service promotion, etc. Algorithms 1 and 4 described above with respect to FIGS. 2 and 7 are examples of the process 1400a.

The process 1400a can be performed using a distributed computing system, such as the distributed computing system 100, which includes a number of processors (e.g., distrusted among different users or located in different places). Each of the processors can function as or support one or more individual solvers, for example, by leveraging multi-core processing capabilities. A solver can be a computer-implemented solver, for example, implemented by software, hardware, or a combination of both. Each individual solver can run independently, in parallel with each other. In some embodiments, some of the individual solvers can function as the IP solvers (also referred to as mappers) 110 that can run independently, in parallel with each other. In some embodiments, one or more of the processors can function as aggregators (also referred to as reducers) 120 that can run independently, in parallel with each other. In some embodiments, one or more of the processors can function as the dual multiplier updater (also referred to as a master node) 130. In some embodiments, a single processor can be used to function as an IP solver, an aggregator, and a dual multiplier updater, as long as, that different individual solvers can run independently, in parallel with each other and different aggregators can run independently, in parallel with each other, for example, to leverage parallel processing capabilities and reduce computation time of solving the KP.

In some embodiments, the distributed computing system can be implemented as a cloud computing system. In some embodiments, the distributed computing system can have a MapReduce or other distributed computing framework or model. In some embodiments, the distributed computing system can be implemented using common distributed platforms such as MPI, HADOOP and SPARK. In some embodiments, the process 1400a will be described as being performed by a data processing apparatus such as a system of one or more computers, located in one or more locations, and programmed appropriately in accordance with this specification. For example, a computer system 1500 of FIG. 15, appropriately programmed, can perform the process 1400a.

At 1402a, data representing the K global constraints and the L local constraints of the KP is received. In some embodiments, L is in an order of billions or larger. K is smaller than L. Each of the K global constraints restricts a respective maximum per-pool cost of the M resources across two or more users, for example, as shown in Eq. (2). Each of the L local constraints restricts a per-user selection of the M resources, for example, as shown in Eq. (3).

At 1404a, the KP is decomposed into N sub-problems using K dual multipliers (e.g., $\lambda_k$, k=1, 2, . . . , K), for example, in a manner as shown in Eqs. (8)-(13). Each of the N sub-problems corresponding to a respective one of the N users and subject to the L local constraints with respect to (w.r.t.) the corresponding user, for example, as shown in Eqs. (14)-(16). In some embodiments, N is in an order of a billion or larger. Each of the K dual multipliers corresponds to a respective one of the K global constraints. Given the K dual multipliers, the N sub-problems can be solved independently respecting the L local constraints w.r.t. the corresponding user, without considering the K global constraints in solving each of the N sub-problems.

At 1406a, the number of individual solvers (e.g., the IP solver 110) for solving the N sub-problems is determined. In some embodiments, determining the number of individual solvers for solving the N sub-problems includes determining the number of individual solvers for solving the N sub-problems based on a specified computation time for solving the KP (e.g., a desired computation time for solving the KP given the large-scale of the KP that involves up to billions of users and local constraints). In some embodiments, determining the number of individual solvers for solving the N sub-problems includes determining the number of individual solvers to be equal to or less than N, the number of users. In the case that the number of individual solvers is N, each of the N sub-problems can be solved by a respective individual solver so that the N sub-problems can be solved by the respective N individual solvers independently, in parallel with each other.

At 1408a, the N sub-problems are distributed among the number of individual solvers, for example, by assigning each sub-problem to a respective solver. For example, an individual solver can be allocated with one or a few (e.g., in the order of one, ten, hundred, or thousand) of the N sub-problems so as to distribute the computational load and reduce the computation time of solving the overall KP by leveraging the parallel processing capabilities of the multiple individual solvers.

At 1410a, the KP is solved by the distributed computing system by performing two or more iterations. In some embodiments, a set of initial values of the K dual multipliers can be used for decomposing the KP into N sub-problems at 1404a. The initial values of the K dual multipliers can, for example, be determined to be predetermined or random values, or be estimated by pre-solving using sampled data as described above. The K dual multipliers can be updated, and the N sub-problems decomposed based on the K dual multipliers can thus be updated accordingly. As such, the KP can be solved by solving the N sub-problems in an iterative manner, for example, in a MapReduce manner as shown in MapReduce algorithm 250 (also referred to as Algorithm 1) in FIG. 1 or synchronous coordinate descent (SCD) algorithm (also referred to as Algorithm 4) 750 in FIG. 7.

In one iteration, at 1412a, each of the N sub-problems is solved by one of the number of individual solvers independently. In some embodiments, each of the N sub-problems is solved by executing a Map function (e.g., as shown at 252 or 752) by one of the number of individual solvers or mappers independently (e.g., in parallel with each other). The Map function can be defined as the Map function 210 or 710, or in another manner. In some embodiments, solving each of the N sub-problems includes computing an amount of each of the M resources to be allocated to the corresponding user of the N user (e.g., the decision variable $x_{i,j}$).

In some embodiments, solving each of the N sub-problems by one of the number of individual solvers independently includes solving each of the N sub-problems by the solver to which the sub-problem was assigned independently. In some embodiments, solving each of the N sub-problems by one of the number of individual solvers independently includes solving each of the N sub-problems by one of the number of individual solvers in parallel. In some embodiments, solving by one of the number of individual solvers independently includes solving each of the N sub-problems by a respective one of the N individual solvers in parallel. In some embodiments, each of the N sub-problems is an integer programming (IP) problem. Accordingly, solving each of the N sub-problems by one of the number of individual solvers independently includes solving an IP problem by an IP solver independently.

In some embodiments, solving each of the N sub-problems further includes computing, for each of the K pools, a per-pool cost of the M resources by the corresponding user based on the amount of each of the M resources to be allocated to the corresponding user, for example, as defined in the Map function 210. In some embodiments, for each of the K pools, a per-pool cost of the M resources across the N users is computed based on the amount of each of the M resources to be allocated to the corresponding user of the N user.

At 1414*a*, the K dual multipliers are updated based on the amount of each of the M resources to be allocated to the corresponding user of the N user. In some embodiments, the K dual multipliers can be updated by executing a Reduce function (e.g., as shown at 254 or 754) by one or more individual aggregators or reducers. In some embodiments, each of the K dual multipliers can be updated by executing a Reduce function (e.g., as shown at 254 or 754) by one of the number of individual aggregators or reducers independently (e.g., in parallel with each other). The Reduce function can be defined as the Reduce function 220 or 720, or in another manner. In some embodiments, the K dual multipliers can be updated according to dual descent (DD), synchronous coordinate descent, cyclic coordinate descent, block coordinate descent, or other multiplier updating algorithm.

In some embodiments, updating the K dual multipliers based on the amount of each of the M resources to be allocated to the corresponding user of the N user includes, for example, as the Reduce function 220, updating each of the K dual multipliers w.r.t. a corresponding pool based on a difference between a maximum per-pool cost of the M resources across two or more users for the corresponding pool restricted by a corresponding global constraint and a per-pool cost of the M resources across the N users for the corresponding pool computed based on the amount of each of the M resources to be allocated to the corresponding user of the N user.

In some embodiments, the number of individual reducers for updating the K dual multipliers can be determined, for example, based on a specified computation time for solving the KP (e.g., a desired computation time for solving the KP). In some embodiments, determining the number of individual reducers for updating the K dual multipliers includes determining the number of individual reducers to be equal to or less than K, the number of global constraints. In the case where the number of individual reducers is K, each of the K dual multipliers can be updated by a respective individual reducer so that the K dual multipliers can be updated by the respective K individual reducers independently, in parallel with each other.

At 1416*a*, determining whether a convergence condition is met. The convergence condition can be defined, for example, based on a maximum number of iterations, the K dual multipliers, or both. For example, the convergence condition can be met if either the K dual multipliers have converged or a maximum number of iterations have been executed. Additional or different convergence conditions can be specified.

At 1418*a*, in response to determining that a convergence condition is met (e.g., based on the K dual multipliers), each of the N sub-problems based on the K dual multipliers can be solved again by one of the number of individual solvers independently, wherein solving each of the N sub-problems includes computing an amount of each of the M resources to be allocated to the corresponding user of the N user.

At 1420*a*, the amount of each of the M resources can be returned as the output of the process 1400*a* and can be allocated to the corresponding user of the N user.

FIG. 14B is a flowchart of an example of a process 1400*b* for performing resource allocation of M resources subject to L constraints, in accordance with embodiments of this specification. In some embodiments, the resource allocation of M resources subject to L constraints can be represented by an integer programming (IP) problem, such as the IP problem represented by Eqs. (14)-(16). The resource allocation of M resources subject to L constraints can represent one or more real-world scenarios such as resource allocation in traffic routing/management, marketing campaign, product/service promotion, etc. Algorithm 2 described above with respect to FIG. 4 is an example of the process 1400*b*.

In some embodiments, the resource allocation of M resources subject to L constraints can be a stand-alone problem or one of N sub-problems of a KP subject to K global constraints and the L local constraints, for example, as represented in (1)-(4). In some embodiments, the process 1400*b* is performed for one of N users performing resource allocation of the M resources among the N users into K pools subject to K global constraints and the L constraints, wherein each of the L constraints restricts a respective maximum number of resources out of the M resources to be selected by a single user, and each of the K global constraints limits resources allocated for each pool across the N users.

The process 1400*b* can be performed using an IP solver (e.g., the mapper 110), which can be implemented by one or more processors. In some embodiments, the process 1400*b* will be described as being performed by a data processing apparatus such as a system of one or more computers, located in one or more locations, and programmed appropriately in accordance with this specification. For example, a computer system 1500 of FIG. 15, appropriately programmed, can perform the process 1400*b*.

At 1402*b*, data representing L constraints is received. In some embodiments, each of the L constraints corresponds to a subset of M resources and restricts a respective maximum number C of resources to be selected among the subset of the M resources, for example, as shown in Eq. (3). In some embodiments, the L constraints have a hierarchal structure, for example, as described w.r.t. FIG. 5. For example, any subset corresponding to a first constraint out of the L constraints has no common resource with any other subset corresponding to a second constraint out of the L constraints, unless the subset corresponding to the first constraint is a subset of the other subset corresponding to the second constraint.

In some embodiments, the data representing the L constraints includes L index subsets, each of the L index subsets corresponding to a respective one of the L constraints and including indexes of a subset of the M resources corresponding to the respective one of the L constraints. For example, a constraint l of the L constraints corresponds to a subset $S_l$ of the M resources and restricts a maximum number $C_l$ of resources to be selected out of the subset $S_l$. In some embodiments, the subset $S_l$ includes indexes of a subset of the M resources corresponding to the constraint l, where l=1, 2, ..., L.

In some embodiments, the data representing the L constraints includes data representing each of the L constraints by a node in a directed acyclic graph (DAG) data structure, for example, as described w.r.t. FIG. 5. In some embodiments, an edge of the DAG represents a relationship between two of the L constraints corresponding to two nodes of the edge. The DAG has no directed cycles.

At 1404b, a topological ordering of the L constraints is determined, wherein the topological ordering defines a traversing order of the L constraints. In some embodiments, the topological ordering of the L constraints is determined using existing algorithms for determining a topological ordering of a DAG.

At 1406b, all the M resources are selected as an initial selection, for example, by setting the decision variables for each the M resources as 1 (or any other value), as shown at 410 in Algorithm 2.

At 1408b, data representing M rewards is obtained, wherein each reward corresponds to one of the M resources, respectively. In some embodiments, the M rewards are M cost-adjusted rewards, respectively, wherein each of the M cost-adjusted rewards includes a reward minus a cost if one of the M resources is selected.

At 1410b, the M resources are sorted in a non-increasing order according to the M rewards corresponding to the M resources (e.g., as shown as 420 in Algorithm 2).

At 1412b, one or more resources are removed from the initial selection by traversing each constraint in the topological ordering of the L constraints, for example, as shown at 420-450 in Algorithm 2. In some embodiments, the removing includes: at 1414b, for a constraint l of the L constraints corresponding to a subset $S_l$ of the M resources and restricting a maximum number $C_l$ of resources to be selected out of the subset $S_l$, at 1416b, determining currently selected resources in the subset $S_l$ (e.g., as shown as 440 in Algorithm 2); and at 1418b, unselecting, among the currently selected resources in the subset $S_l$, any resource that is not one of $C_l$ resources that have top $C_l$ rewards among the currently selected resources in the subset $S_l$ (e.g., by updating the decision variables of the unselected resources to be 0, as shown at 450 in Algorithm 2).

In some embodiments, unselecting, among the currently selected resources in the subset $S_l$, any resource that is not one of $C_l$ resources that have top $C_l$ rewards among the currently selected resources in the subset $S_l$ includes unselecting any resource that is not one of $C_l$ resources that have top $C_l$ rewards among the currently selected resources in the subset $S_l$ according to the non-increasing order of the M resources.

At 1420b, it is determined whether all the L constraints in the topological ordering of the L constraints have been traversed. If so, the process 1400b proceeds to 1422b. Otherwise, the process 1400b goes back to 1414b to remove one or more resources for a next constraint l l+1 in the topological ordering of the L constraint.

At 1422b, the selected resources are allocated after traversing all the L constraints in the topological ordering of the L constraints, for example, by returning or outputting the decision variables for each the M resources, as shown at 460 in Algorithm 2.

Figure 14C:
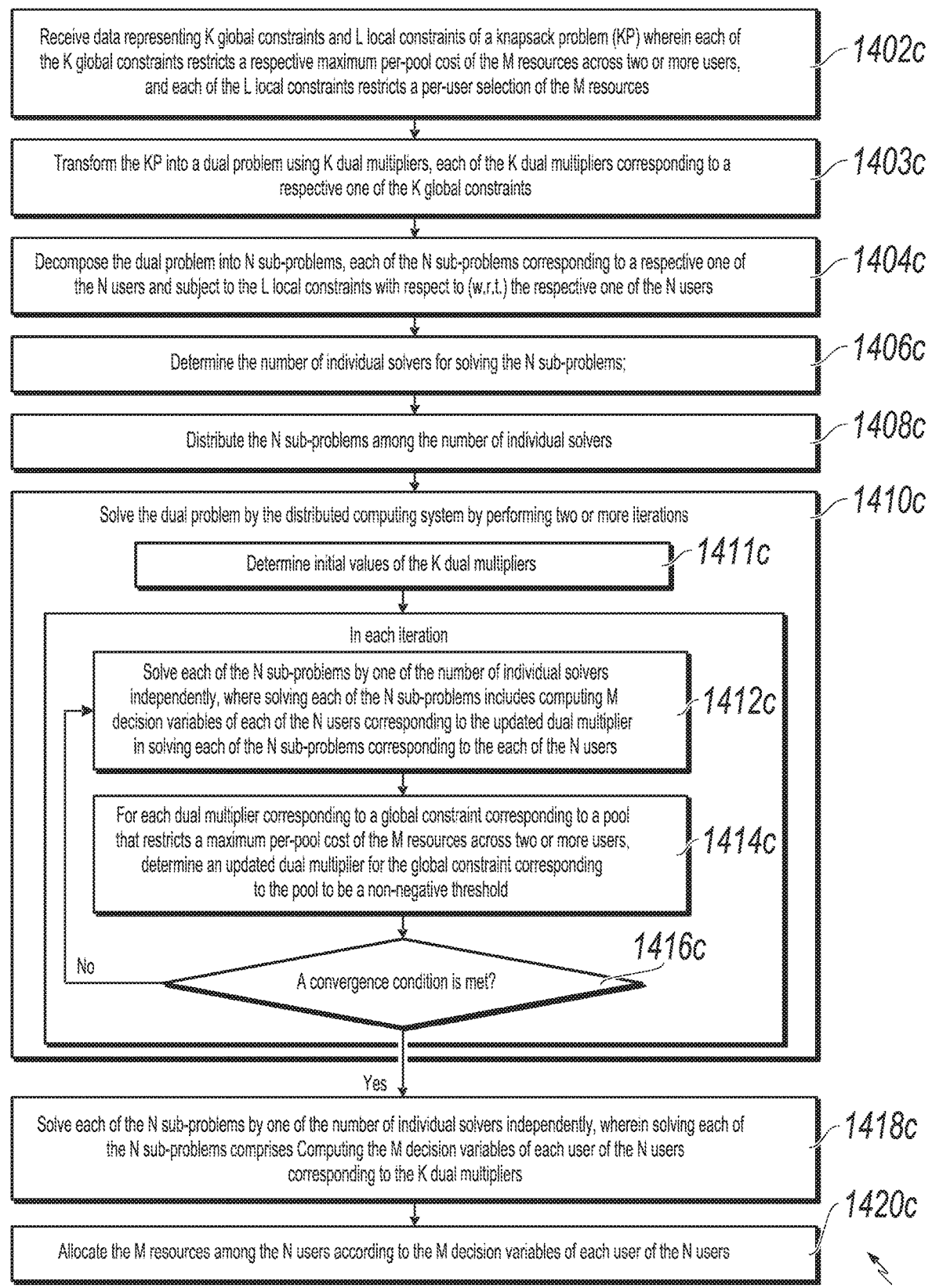
FIG. 14C is a flowchart of another example of a process for performing resource allocation of M resources among N users into K pools (e.g., K knapsacks) by solving a knapsack problem (KP), in accordance with embodiments of this specification.

FIG. 14C is a flowchart of another example of a process 1400c for performing resource allocation of M resources among N users into K pools (e.g., K knapsacks) by solving a knapsack problem (KP), in accordance with embodiments of this specification. The KP subject to K global constraints and L local constraints, for example, as represented in (1)-(4). Each pool can correspond to a respective knapsack as described in the KP. The KP can represent one or more real-world scenarios such as resource allocation including traffic routing/management, marketing campaign, product/service promotion, etc. Algorithm 4 described above with respect to FIG. 7 can be an example of the process 1400c.

The process 1400c can be performed using a distributed computing system, such as the distributed computing system 100, which includes a number of processors (e.g., distrusted among different users or located in different places). Each of the processors can function as, or support, one or more individual solvers, for example, by leveraging multi-core processing capabilities. Each individual solver can run independently, in parallel with each other. In some embodiments, some of the individual solvers can function as the IP solvers (also referred to as mappers) 110 that can run independently, in parallel with each other. In some embodiments, one or more of the processors can function as aggregators (also referred to as reducers) 120 that can run independently, in parallel with each other. In some embodiments, one or more of the processors can function as the dual multiplier updater (also referred to as a master node) 130. In some embodiments, a single processor can be used to function as an IP solver, an aggregator, and a dual multiplier updater, as long as that different individual solvers can run independently, in parallel with each other and different aggregators can run independently, in parallel with each other, for example, to leverage parallel processing capabilities and reduce computation time of solving the KP.

In some embodiments, the distributed computing system can be implemented as a cloud computing system. In some embodiments, the distributed computing system can have a MapReduce or other distributed computing framework or model. In some embodiments, the distributed computing system can be implemented using common distributed platforms such as MPI, HADOOP, and SPARK. In some embodiments, the process 1400c will be described as being performed by a data processing apparatus such as a system of one or more computers, located in one or more locations, and programmed appropriately, in accordance with this specification. For example, a computer system 1500 of FIG. 15, appropriately programmed, can perform the process 1400c.

At 1402c, data representing the K global constraints and the L local constraints of the KP is received. In some embodiments, L is in an order of billions or larger. K is smaller than L. Each of the K global constraints restricts a respective maximum per-pool cost of the M resources across two or more users, for example, as shown in Eq. (2). Each of the L local constraints restricts a per-user selection of the M resources, for example, as shown in Eq. (3).

At 1403c, the KP is transformed into a dual problem using K dual multipliers, (e.g., $\lambda_k$, k=1, 2, ..., K), for example, in a manner as shown in Eqs. (8)-(13). Each of the K dual multipliers corresponds to a respective one of the K global constraints.

At 1404c, the dual problem is decomposed into N sub-problems, each of the N sub-problems corresponding to a respective one of the N users and subject to the L local constraints with respect to (w.r.t.) the respective one of the N users, for example, as shown in Eqs. (14)-(16). In some embodiments, N is in an order of a billion or larger.

In some embodiments, the L constraints have a hierarchal structure, for example, as described w.r.t. FIG. 5. For example, any subset corresponding to a first constraint out of the L constraints has no common resource with any other subset corresponding to a second constraint out of the L constraints, unless the subset corresponding to the first constraint is a subset of the other subset corresponding to the second constraint.

Given the K dual multipliers, the N sub-problems can be solved independently respecting the L local constraints w.r.t. the corresponding user, without considering the K global constraints in solving each of the N sub-problems.

At 1406c, the number of individual solvers (e.g., the IP solver 110) for solving the N sub-problems is determined. In some embodiments, determining the number of individual solvers for solving the N sub-problems includes determining the number of individual solvers for solving the N sub-problems based on a specified computation time for solving the KP (e.g., a desired computation time for solving the KP given the large-scale of the KP that involves up to billions of users and local constraints). In some embodiments, determining the number of individual solvers for solving the N sub-problems includes determining the number of individual solvers to be equal to or less than N, the number of users. In the case that the number of individual solvers is N, each of the N sub-problems can be solved by a respective individual solver so that the N sub-problems can be solved by the respective N individual solvers independently, in parallel with each other.

At 1408c, the N sub-problems are distributed among the number of individual solvers. For example, an individual solver can be allocated with one or a few (e.g., in the order of one, ten, hundred, or thousand) of the N sub-problems so as to distribute the computational load and reduce the computation time of solving the overall KP by leveraging the parallel processing capabilities of the multiple individual solvers.

At 1410c, the dual problem is solved by the distributed computing system by performing two or more iterations. In some embodiments, at 1411c, a set of initial values of the K dual multipliers can be determined for decomposing the KP into N sub-problems at 1403c. The initial values of the K dual multipliers can, for example, be determined to be predetermined or random values, or be estimated by pre-solving using sampled data as described above. For example, the initial values of the K dual multipliers are computed based on a sampled version of the KP for resource allocation among S users into the K pools subject to K sampled global constraints and the L local constraints, wherein the S users are sampled from the N users, and each of the K sampled global constraints restricts a respective scaled-down maximum total cost of resources across the S users for each of the K pools.

The K dual multipliers can be updated, and the N sub-problems decomposed based on the K dual multipliers can thus be updated accordingly. As such, the KP can be solved by solving the N sub-problems in an iterative manner, for example, in a MapReduce manner as shown in synchronous coordinate descent (SCD) algorithm (also referred to as Algorithm 4) 750 in FIG. 7.

For example, in one iteration, at 1412c, each of the N sub-problems is solved by one of the number of individual solvers independently. In some embodiments, solving each of the N sub-problems corresponding to the each of the N users includes computing M decision variables (e.g., the decision variable $x_{i,j}$) of each of the N users corresponding to the updated dual multiplier, wherein each of the M decision variables indicates whether or not to select a respective one of the M resources by the each of the N users.

In some embodiments, each of the N sub-problems is solved by executing a Map function (e.g., as shown at 752) by one of the number of individual solvers or mappers independently (e.g., in parallel with each other). The Map function can be defined as the Map function 710, or in another manner. For example, solving each of the N sub-problems corresponding to the each of the N users includes: for a sub-problem corresponding to a user and for each dual multiplier corresponding to the global constraint corresponding to the pool, computing candidates of the dual multiplier; sorting the candidates of the dual multiplier in a non-increasing order; traversing the candidates of the dual multiplier in the non-increasing order: for each candidate of the dual multiplier, computing M decision variables of the user corresponding to the candidate of the dual multiplier; and computing an incremental cost of selected resources based on the M decision variables of the user corresponding to the candidate of the dual multiplier relative to a cost of selected resources based on the M decision variables of the user corresponding to a candidate of the dual multiplier preceding the candidate of the dual multiplier in the non-increasing order. In some embodiments, a total cost of resources selected across the N users for the pool corresponding to a certain dual multiplier is computed by summing incremental costs of selected resources of the user corresponding to all candidates of the dual multiplier that are larger than or equal to the certain dual multiplier.

In some embodiments, computing candidates of the dual multiplier includes computing pair-wise intersections points of M linear functions of the dual multiplier, wherein the M linear functions of the dual multiplier represent M cost-adjusted rewards of the M resources given the dual multiplier.

In some embodiments, the non-negative threshold is computed based on the candidates of the dual multiplier sorted in the non-increasing order and a respective total cost of resources selected across the N users for the pool corresponding to one of the candidates of the dual multiplier in the non-increasing order, for example, according to the techniques as described w.r.t. FIG. 13. In some embodiments, interpolation is performed on the candidates of the dual multiplier sorted in the non-increasing order for the computing the non-negative threshold, for example, according to the techniques as described w.r.t. FIG. 13.

In some embodiments, bucketing schemes such as the fine-tuned bucketing algorithm described above can be performed to speed up the convergence of the process 1400c. For example, the candidates of the dual multiplier are grouped into a plurality of non-uniform budgets; sums of incremental costs of selected resources of the user corresponding to respective candidates of the dual multiplier in the plurality of non-uniform budgets are computed; and the non-negative threshold is computed based on the sums of incremental costs.

In some embodiments, solving each of the N sub-problems by one of the number of individual solvers independently includes solving each of the N sub-problems by the solver to which the sub-problem was assigned independently. In some embodiments, solving each of the N sub-problems by one of the number of individual solvers independently includes solving each of the N sub-problems by one of the number of individual solvers in parallel. In some embodiments, solving by one of the number of individual solvers independently includes solving each of the N sub-problems by a respective one of the N individual solvers in parallel. In some embodiments, each of the N sub-problems is an integer programming (IP) problem. Accordingly, solving each of the N sub-problems by one of the number of individual solvers independently includes solving an IP problem by an IP solver (e.g., the hierarchical greedy IP solver as described w.r.t. FIG. 4) independently.

At 1414c, for each dual multiplier corresponding to a global constraint corresponding to a pool that restricts a maximum per-pool cost of the M resources across two or more users, an updated dual multiplier for the global constraint corresponding to the pool is determined, for example, to be a non-negative threshold such as the minimal threshold v as shown at 722 of Algorithm 4 in FIG. 7. The non-negative threshold can be such that a total cost of resources selected across the N users for the pool corresponding to a dual multiplier that is less than the non-negative threshold exceeds the maximum per-pool cost; and a total cost of resources selected across the N users for the pool corresponding to a dual multiplier that is not less than the non-negative threshold does not exceed the maximum per-pool cost.

At 1416c, determining whether a convergence condition is met. The convergence condition can be defined, for example, based on a maximum number of iterations, the K dual multipliers, or both. For example, the convergence condition can be met if either the K dual multipliers have converged or a maximum number of iterations have been executed. Additional or different convergence conditions can be specified.

At 1418c, in response to determining that a convergence condition is met (e.g., based on the K dual multipliers), each of the N sub-problems based on the K dual multipliers can be solved again by one of the number of individual solvers independently, wherein solving each of the N sub-problems includes computing M decision variables of each of the N users corresponding to the K dual multipliers.

At 1420c, the M resources are allocated among the N users according to the M decision variables of each user of the N users. The M decision variables of each user of the N users can be returned as the output of the process 1400c.

Figure 15:
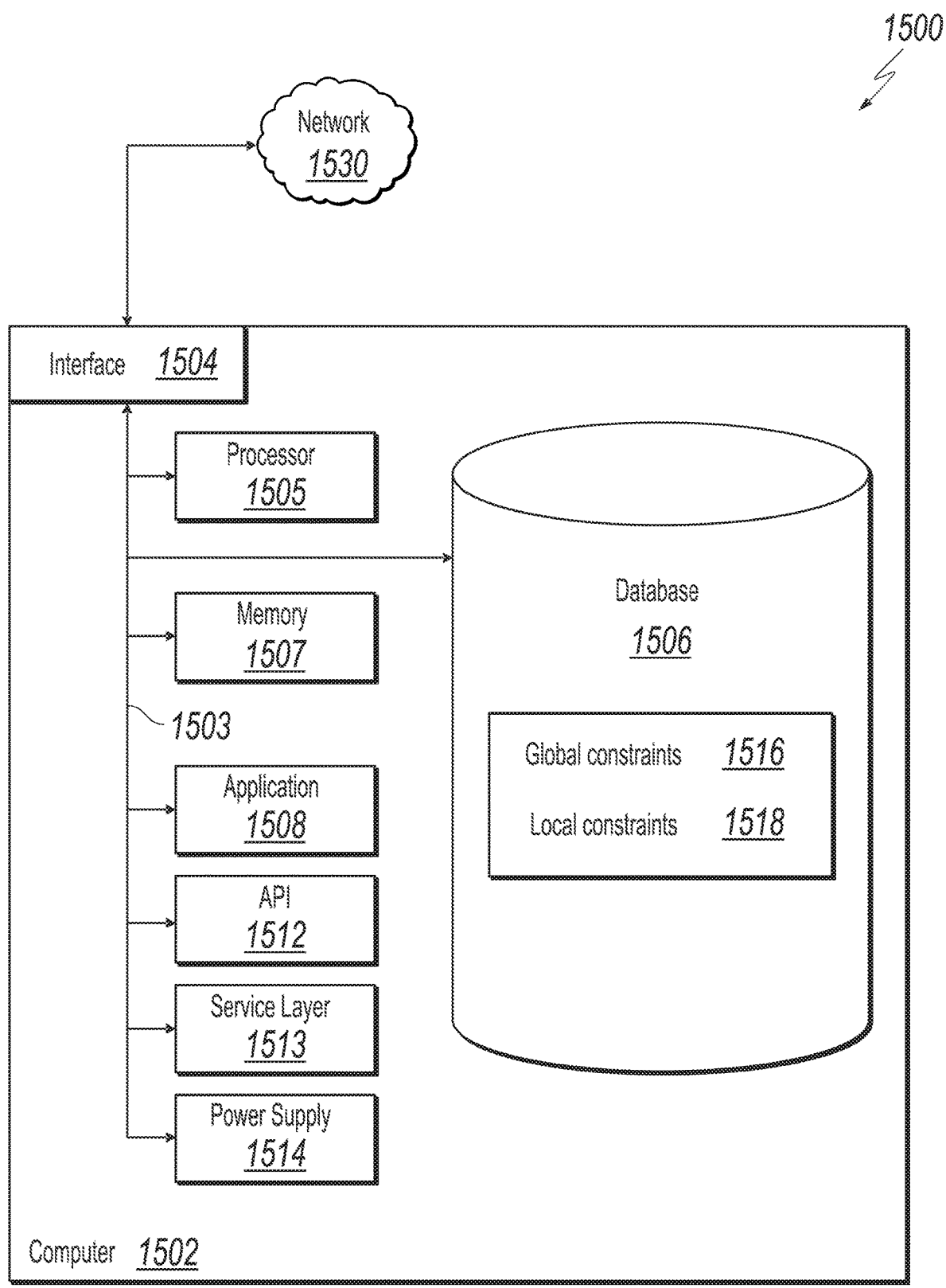
FIG. 15 depicts a block diagram illustrating an example of a computer-implemented system used to provide computational functionalities associated with described algorithms, methods, functions, processes, flows, and procedures in accordance with embodiments of this specification.

FIG. 15 depicts a block diagram illustrating an example of a computer-implemented system 1500 used to provide computational functionalities associated with described algorithms, methods, functions, processes, flows, and procedures in accordance with embodiments of this specification. FIG. 15 is a block diagram illustrating an example of a computer-implemented system 1500 used to provide computational functionalities associated with described algorithms, methods, functions, processes, flows, and procedures, according to an embodiment of the present disclosure. In the illustrated embodiment, System 1500 includes a Computer 1502 and a Network 1530.

The illustrated Computer 1502 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 1502 can include an input device, such as a keypad, keyboard, touch screen, another input device, or a combination of input devices that can accept user information, and an output device that conveys information associated with the operation of the Computer 1502, including digital data, visual, audio, another type of information, or a combination of types of information, on a graphical-type user interface (UI) (or GUI) or other UI.

The Computer 1502 can serve in a role in a distributed computing system as a client, network component, a server, a database or another persistency, another role, or a combination of roles for performing the subject matter described in the present disclosure. The illustrated Computer 1502 is communicably coupled with a Network 1530. In some embodiments, one or more components of the Computer 1502 can be configured to operate within an environment, including cloud-computing-based, local, global, another environment, or a combination of environments.

At a high level, the Computer 1502 is an electronic computing device operable to receive, transmit, process, store, or manage data and information associated with the described subject matter. According to some embodiments, the Computer 1502 can also include or be communicably coupled with a server, including an application server, e-mail server, web server, caching server, streaming data server, another server, or a combination of servers.

The Computer 1502 can receive requests over Network 1530 (for example, from a client software application executing on another Computer 1502) and respond to the received requests by processing the received requests using a software application or a combination of software applications. In addition, requests can also be sent to the Computer 1502 from internal users (for example, from a command console or by another internal access method), external or third-parties, or other entities, individuals, systems, or computers.

Each of the components of the Computer 1502 can communicate using a System Bus 1503. In some embodiments, any or all of the components of the Computer 1502, including hardware, software, or a combination of hardware and software, can interface over the System Bus 1503 using an application programming interface (API) 1512, a Service Layer 1513, or a combination of the API 1512 and Service Layer 1513. The API 1512 can include specifications for routines, data structures, and object classes. The API 1512 can be either computer-language independent or dependent and refer to a complete interface, a single function, or even a set of APIs. The Service Layer 1513 provides software services to the Computer 1502 or other components (whether illustrated or not) that are communicably coupled to the Computer 1502. The functionality of the Computer 1502 can be accessible for all service consumers using the Service Layer 1513. Software services, such as those provided by the Service Layer 1513, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 1502, alternative embodiments can illustrate the API 1512 or the Service Layer 1513 as stand-alone components in relation to other components of the Computer 1502 or other components (whether illustrated or not) that are communicably coupled to the Computer 1502. Moreover, any or all parts of the API 1512 or the Service Layer 1513 can be implemented as a child or a sub-module of another software module, enterprise application, or hardware module without departing from the scope of the present disclosure.

The Computer 1502 includes an Interface 1504. Although illustrated as a single Interface 1504, two or more Interfaces 1504 can be used according to particular needs, desires, or particular embodiments of the Computer 1502. The Interface 1504 is used by the Computer 1502 for communicating with another computing system (whether illustrated or not) that is communicatively linked to the Network 1530 in a distributed environment. Generally, the Interface 1504 is operable to communicate with the Network 1530 and includes logic encoded in software, hardware, or a combination of software and hardware. More specifically, the Interface 1504 can include software supporting one or more communication protocols associated with communications such that the Network 1530 or hardware of Interface 1504 is operable to communicate physical signals within and outside of the illustrated Computer 1502.

The Computer 1502 includes a Processor 1505. Although illustrated as a single Processor 1505, two or more Processors 1505 can be used according to particular needs, desires, or particular embodiments of the Computer 1502. Generally, the Processor 1505 executes instructions and manipulates data to perform the operations of the Computer 1502 and any algorithms, methods, functions, processes, flows, and procedures as described in the present disclosure.

The Computer 1502 also includes a Database 1506 that can hold data for the Computer 1502, another component communicatively linked to the Network 1530 (whether illustrated or not), or a combination of the Computer 1502 and another component. For example, Database 1506 can be an in-memory, conventional, or another type of database storing data consistent with the present disclosure. In some embodiments, Database 1506 can be a combination of two or more different database types (for example, a hybrid in-memory and conventional database) according to particular needs, desires, or particular embodiments of the Computer 1502 and the described functionality. Although illustrated as a single Database 1506, two or more databases of similar or differing types can be used according to particular needs, desires, or particular embodiments of the Computer 1502 and the described functionality. While Database 1506 is illustrated as an integral component of the Computer 1502, in alternative embodiments, Database 1506 can be external to the Computer 1502. As an example, Database 1506 can include the above-described global constraints 1516 and local constraints 1518 of a KP.

The Computer 1502 also includes a Memory 1507 that can hold data for the Computer 1502, another component or components communicatively linked to the Network 1530 (whether illustrated or not), or a combination of the Computer 1502 and another component. Memory 1507 can store any data consistent with the present disclosure. In some embodiments, Memory 1507 can be a combination of two or more different types of memory (for example, a combination of semiconductor and magnetic storage) according to particular needs, desires, or particular embodiments of the Computer 1502 and the described functionality. Although illustrated as a single Memory 1507, two or more Memories 1507 or similar or differing types can be used according to particular needs, desires, or particular embodiments of the Computer 1502 and the described functionality. While Memory 1507 is illustrated as an integral component of the Computer 1502, in alternative embodiments, Memory 1507 can be external to the Computer 1502.

The Application 1508 is an algorithmic software engine providing functionality according to particular needs, desires, or particular embodiments of the Computer 1502, particularly with respect to functionality described in the present disclosure. For example, Application 1508 can serve as one or more components, modules, or applications. Further, although illustrated as a single Application 1508, the Application 1508 can be implemented as multiple Applications 1508 on the Computer 1502. In addition, although illustrated as integral to the Computer 1502, in alternative embodiments, the Application 1508 can be external to the Computer 1502.

The Computer 1502 can also include a Power Supply 1514. The Power Supply 1514 can include a rechargeable or non-rechargeable battery that can be configured to be either user- or non-user-replaceable. In some embodiments, the Power Supply 1514 can include power-conversion or management circuits (including recharging, standby, or another power management functionality). In some embodiments, the Power Supply 1514 can include a power plug to allow the Computer 1502 to be plugged into a wall socket or another power source to, for example, power the Computer 1502 or recharge a rechargeable battery.

There can be any number of Computers 1502 associated with, or external to, a computer system containing Computer 1502, each Computer 1502 communicating over Network 1530. Further, the term "client," "user," or other appropriate terminology can be used interchangeably, as appropriate, without departing from the scope of the present disclosure. Moreover, the present disclosure contemplates that many users can use one Computer 1502, or that one user can use multiple computers 1502.

Figure 16A:
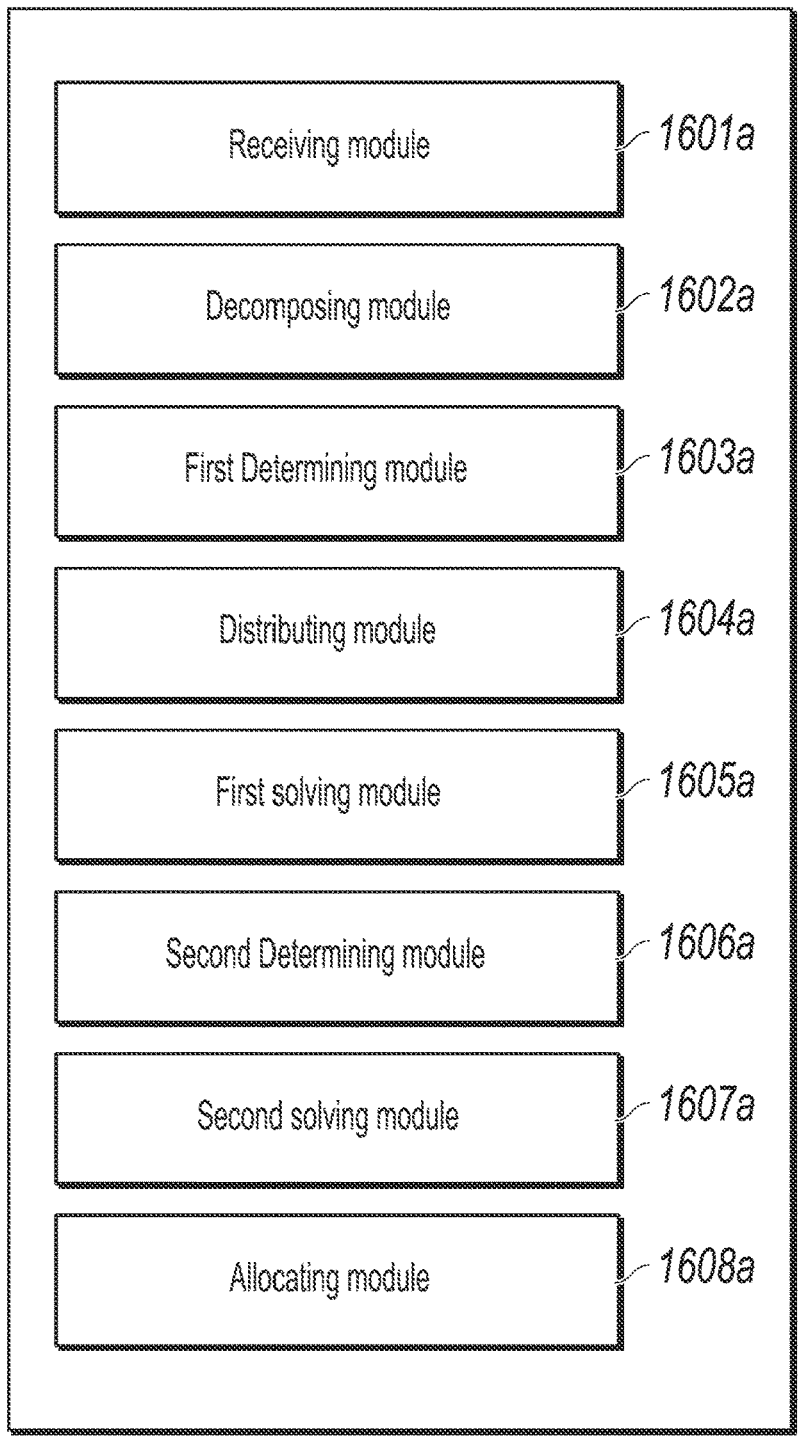
FIG. 16A-C are diagrams of examples of modules of apparatuses in accordance with embodiments of this specification.

FIG. 16A is a diagram of on example of modules of an apparatus 1600a in accordance with embodiments of this specification. The apparatus 1600a can be an example embodiment of a data processing apparatus, such as a distributed computing system that includes a number of individual computer-implemented solvers, for performing resource allocation of M resources among N users into K pools by solving a knapsack problem (KP) subject to K global constraints and L local constraints. The apparatus 1600a can correspond to the embodiments described above, and the apparatus 1600a includes the following: a receiving module 1601a for receiving data representing the K global constraints and the L local constraints, wherein K is smaller than L, where each of the K global constraints restricts a respective maximum per-pool cost of the M resources across two or more users, and each of the L local constraints restricts a per-user selection of the M resources; a decomposing module 1602a for decomposing the KP into N sub-problems using K dual multipliers, each of the N sub-problems corresponding to a respective one of the N users and subject to the L local constraints with respect to (w.r.t.) the corresponding user, wherein N is in an order of billions or larger, wherein each of the K dual multipliers corresponds to a respective one of the K global constraints; a first determining module 1603a for determining the number of individual computer-implemented solvers for solving the N sub-problems; a distributing module 1604a for distributing the N sub-problems among the number of individual computer-implemented solvers; and a first solving module 1605a for solving the KP by the distributed computing system by performing two or more iterations. The first solving module 1605a further includes a first solving sub-module for, in one iteration, solving each of the N sub-problems by one of the number of individual computer-implemented solvers independently, wherein solving each of the N sub-problems includes computing an amount of each of the M resources to be allocated to the corresponding user of the N user; and an updating sub-module for updating the K dual multipliers based on the amount of each of the M resources to be allocated to the corresponding user of the N user.

In an optional embodiment, L is in an order of billions or larger.

In an optional embodiment, determining the number of individual computer-implemented solvers for solving the N sub-problems includes determining the number of individual computer-implemented solvers for solving the N sub-problems based on a specified computation time for solving the KP; and solving each of the N sub-problems by one of the number of individual computer-implemented solvers independently includes solving each of the N sub-problems by one of the number of individual computer-implemented solvers in parallel.

In an optional embodiment, determining the number of individual computer-implemented solvers for solving the N sub-problems includes determining the number of individual computer-implemented solvers to be N, and solving each of the N sub-problems by one of the number of individual computer-implemented solvers independently includes solving each of the N sub-problems by a respective one of the N individual computer-implemented solvers in parallel.

In an optional embodiment, solving each of the N sub-problems by one of the number of individual computer-implemented solvers independently includes solving an integer programming (IP) problem by an IP computer-implemented solver independently.

In an optional embodiment, the apparatus 1600a further includes: a second determining module 1606a for determining whether a convergence condition is met based on the K dual multipliers; a second solving module 1607a for solving each of the N sub-problems based on the K dual multipliers by one of the number of individual computer-implemented solvers independently in response to determining that a convergence condition is met based on the K dual multipliers, wherein solving each of the N sub-problems includes computing an amount of each of the M resources to be allocated to the corresponding user of the N user, and an allocating module 1608a for allocating the amount of each of the M resources to the corresponding user of the N user.

In an optional embodiment, solving each of the N sub-problems further includes computing, for each of the K pools, a per-pool cost of the M resources by the corresponding user based on the amount of each of the M resources to be allocated to the corresponding user.

In an optional embodiment, the apparatus 1600a further includes: a computing module for computing, in one iteration, for each of the K pools, a per-pool cost of the M resources across the N users based on the amount of each of the M resources to be allocated to the corresponding user of the N users; and the updating sub-module that updates each of the K dual multipliers w.r.t. a corresponding pool based on a difference between a maximum per-pool cost of the M resources across two or more users for the corresponding pool restricted by a corresponding global constraint and a per-pool cost of the M resources across the N users for the corresponding pool computed based on the amount of each of the M resources to be allocated to the corresponding user of the N user.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 16A, it can be interpreted as illustrating an internal functional module and a structure of a data processing apparatus, such as a distributed computing system that includes a number of individual computer-implemented solvers, for performing resource allocation of M resources among N users into K pools by solving a knapsack problem (KP) subject to K global constraints and L local constraints. An execution body in essence can be an electronic device, and the electronic device includes the following: one or more processors and a memory configured to store an executable instruction of the one or more processors.

The one or more processors are configured to receive data representing the K global constraints and the L local constraints, wherein K is smaller than L, each of the K global constraints restricts a respective maximum per-pool cost of the M resources across two or more users, and each of the L local constraints restricts a per-user selection of the M resources; decompose the KP into N sub-problems using K dual multipliers, each of the N sub-problems corresponding to a respective one of the N users and subject to the L local constraints with respect to (w.r.t.) the corresponding user, wherein N is in an order of billion or larger, wherein each of the K dual multipliers corresponds to a respective one of the K global constraints; determine the number of individual computer-implemented solvers for solving the N sub-problems; distribute the N sub-problems among the number of individual computer-implemented solvers; and solve the KP by the distributed computing system by performing two or more iterations. In one iteration, the one or more processors are configured to solve each of the N sub-problems by one of the number of individual computer-implemented solvers independently, wherein solving each of the N sub-problems includes computing an amount of each of the M resources to be allocated to the corresponding user of the N user; and update the K dual multipliers based on the amount of each of the M resources to be allocated to the corresponding user of the N user.

Optionally, L is in an order of billions or larger.

Optionally, determining the number of individual computer-implemented solvers for solving the N sub-problems includes determining the number of individual computer-implemented solvers for solving the N sub-problems based on a specified computation time for solving the KP and solving each of the N sub-problems by one of the number of individual computer-implemented solvers independently includes solving each of the N sub-problems by one of the number of individual computer-implemented solvers in parallel.

Optionally, determining the number of individual computer-implemented solvers for solving the N sub-problems includes determining the number of individual computer-implemented solvers to be N, and solving each of the N sub-problems by one of the number of individual computer-implemented solvers independently includes solving each of the N sub-problems by a respective one of the N individual computer-implemented solvers in parallel.

Optionally, solving each of the N sub-problems by one of the number of individual computer-implemented solvers independently includes solving an integer programming (IP) problem by an IP computer-implemented solver independently.

Optionally, the one or more processors are configured to determine whether a convergence condition is met based on the K dual multipliers; in response to determining that a convergence condition is met based on the K dual multipliers, solve each of the N sub-problems based on the K dual multipliers by one of the number of individual computer-implemented solvers independently, wherein solving each of the N sub-problems includes computing an amount of each of the M resources to be allocated to the corresponding user of the N user; and allocate the amount of each of the M resources to the corresponding user of the N user.

Optionally, solving each of the N sub-problems further includes computing, for each of the K pools, a per-pool cost of the M resources by the corresponding user based on the amount of each of the M resources to be allocated to the corresponding user.

Optionally, the one or more processors are configured to compute for each of the K pools, a per-pool cost of the M resources across the N users based on the amount of each of the M resources to be allocated to the corresponding user of the N user; and wherein updating the K dual multipliers based on the amount of each of the M resources to be allocated to the corresponding user of the N user includes updating each of the K dual multipliers w.r.t. a corresponding pool based on a difference between a maximum per-pool cost of the M resources across two or more users for the corresponding pool restricted by a corresponding global constraint and a per-pool cost of the M resources across the N users for the corresponding pool computed based on the amount of each of the M resources to be allocated to the corresponding user of the N user.

Figure 16B:
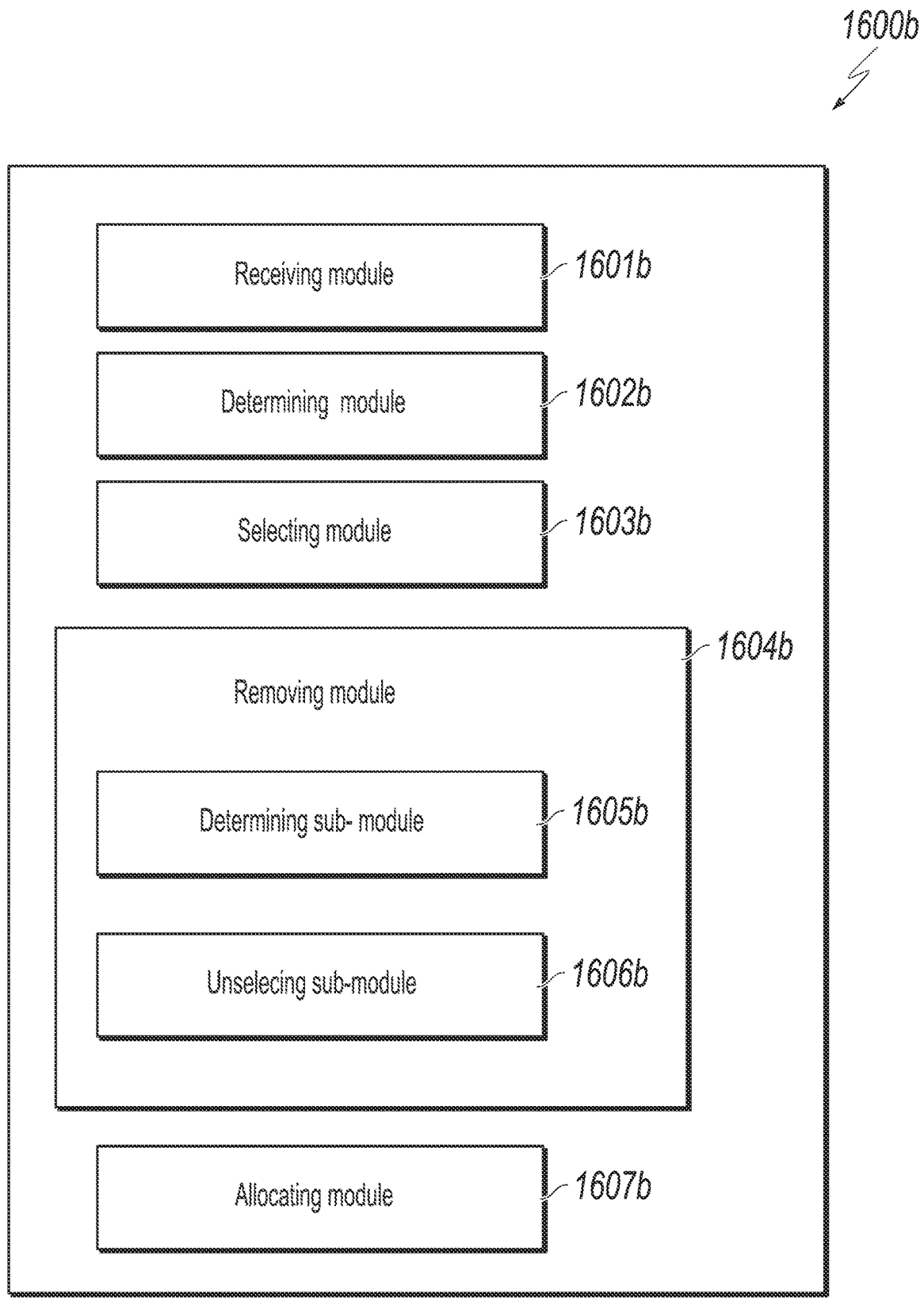

FIG. 16B is a diagram of on example of modules of an apparatus 1600b in accordance with embodiments of this specification. The apparatus 1600b can be an example embodiment of a data processing apparatus for allocating M resources subject to L constraints. The apparatus 1600b can correspond to the embodiments described above, and the apparatus 1600b includes the following: a receiving module 1601b for receiving data representing L constraints, wherein each of the L constraints corresponds to a subset of M resources and restricts a respective maximum number C of resources to be selected among the subset of the M resources, wherein any subset corresponding to a first constraint out of the L constraints has no common resource with any other subset corresponding to a second constraint out of the L constraints, unless the subset corresponding to the first constraint is a subset of the other subset corresponding to the second constraint; a determining module 1602b for determining a topological ordering of the L constraints, wherein the topological ordering defines a traversing order of the L constraints; a selecting module 1603b for selecting all the M resources as an initial selection; a removing module 1604b for removing resources from the initial selection by traversing each constraint in the topological ordering of the L constraints, wherein the removing module 1604b further includes a determining sub-module 1605b for, for a constraint l of the L constraints corresponding to a subset $S_l$ of the M resources and restricting a maximum number $C_l$ of resources to be selected out of the subset $S_l$, determining currently selected resources in the subset $S_l$; and an unselecting sub-module 1606b for unselecting, among the currently selected resources in the subset $S_l$, any resource that is not one of $C_l$ resources that have top $C_l$ rewards among the currently selected resources in the subset $S_l$; and an allocating module 1607b for allocating the selected resources after traversing all the L constraints in the topological ordering of the L constraints.

In an optional embodiment, the data representing the L constraints includes L index subsets, each of the L index subsets corresponds to a respective one of the L constraints and includes indexes of a subset of the M resources corresponding to the respective one of the L constraints; and the subset $S_l$ includes indexes of a subset of the M resources corresponding to the constraint l.

In an optional embodiment, the data representing the L constraints includes data representing each of the L constraints by a node in a directed acyclic graph (DAG) data structure, and an edge of the DAG represents a relationship between two of the L constraints corresponding to two nodes of the edge.

In an optional embodiment, the apparatus 1600b further includes: an obtaining module for obtaining data representing M rewards, each reward corresponding to one of the M resources respectively.

In an optional embodiment, the apparatus 1600b further includes: a sorting module for sorting the M resources in a non-increasing order according to the M rewards corresponding to the M resources before traversing each subset in the L subsets in the topological ordering of the L subsets; and wherein the unselecting sub-module is capable of unselecting the any resource that is not one of $C_l$ resources that have top $C_l$ rewards among the currently selected resources in the subset $S_l$ according to the non-increasing order of the M resources.

In an optional embodiment, the M rewards are M cost-adjusted rewards respectively, wherein each of the M cost-adjusted rewards includes a reward minus a cost if one of the M resources is selected.

In an optional embodiment, the apparatus 1600b is used for performing for one of N users in performing resource allocation of the M resources among the N users into K pools subject to K global constraints and the L constraints, wherein each of the L constraints restricts a respective maximum number of resources out of the M resources to be selected by a single user, and each of the K global constraints limits resources allocated for each pool across the N users.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 16B, it can be interpreted as illustrating an internal functional module and a structure of a data processing apparatus for allocating M resources subject to L constraints. An execution body in essence can be an electronic device, and the electronic device includes the following: one or more processors and a memory configured to store an executable instruction of the one or more processors.

The one or more processors are configured to receive data representing L constraints, wherein each of the L constraints corresponds to a subset of M resources and restricts a respective maximum number C of resources to be selected among the subset of the M resources, wherein any subset corresponding to a first constraint out of the L constraints has no common resource with any other subset corresponding to a second constraint out of the L constraints, unless the subset corresponding to the first constraint is a subset of the other subset corresponding to the second constraint; determine a topological ordering of the L constraints, wherein the topological ordering defines a traverse order of the L constraints; select all the M resources as an initial selection; remove resources from the initial selection by traversing each constraint in the topological ordering of the L constraints, wherein the remove includes: for a constraint l of the L constraints corresponding to a subset $S_l$ of the M resources and restricts a maximum number $C_l$ of resources to be selected out of the subset $S_l$, determine currently selected resources in the subset $S_l$; and unselect, among the currently selected resources in the subset $S_l$, any resource that is not one of $C_l$ resources that have top $C_l$ rewards among the currently selected resources in the subset $S_l$; and allocate the selected resources after traverse all the L constraints in the topological ordering of the L constraints.

Optionally, the data representing the L constraints includes L index subsets, each of the L index subsets corresponding to a respective one of the L constraints and including indexes of a subset of the M resources corresponding to the respective one of the L constraints; and the subset $S_l$ includes indexes of a subset of the M resources corresponding to the constraint l.

Optionally, the data representing the L constraints includes data representing each of the L constraints by a node in a directed acyclic graph (DAG) data structure, and an edge of the DAG represents a relationship between two of the L constraints corresponding to two nodes of the edge.

Optionally, the one or more processors are configured to obtain data representing M rewards, each reward corresponding to one of the M resources respectively.

Optionally, the one or more processors are configured to sort the M resources in a non-increase order according to the M rewards corresponding to the M resources before traversing each subset in the L subsets in the topological ordering of the L subsets; and wherein unselecting, among the currently selected resources in the subset $S_l$, any resource that is not one of $C_l$ resources that have top $C_l$ rewards among the currently selected resources in the subset $S_l$ includes unselecting the any resource that is not one of $C_l$ resources that have top $C_l$ rewards among the currently selected resources in the subset $S_l$ according to the non-increase order of the M resources.

Optionally, the M rewards are M cost-adjusted rewards respectively, wherein each of the M cost-adjusted rewards includes a reward minus a cost if one of the M resources is selected.

Optionally, some or all of the above operations are performed for one of N users in performing resource allocation of the M resources among the N users into K pools subject to K global constraints and the L constraints, wherein each of the L constraints restricts a respective maximum number of resources out of the M resources to be selected by a single user, and each of the K global constraints limits resources allocated for each pool across the N users Optionally, L is in an order of billions or larger.

Figure 16C:
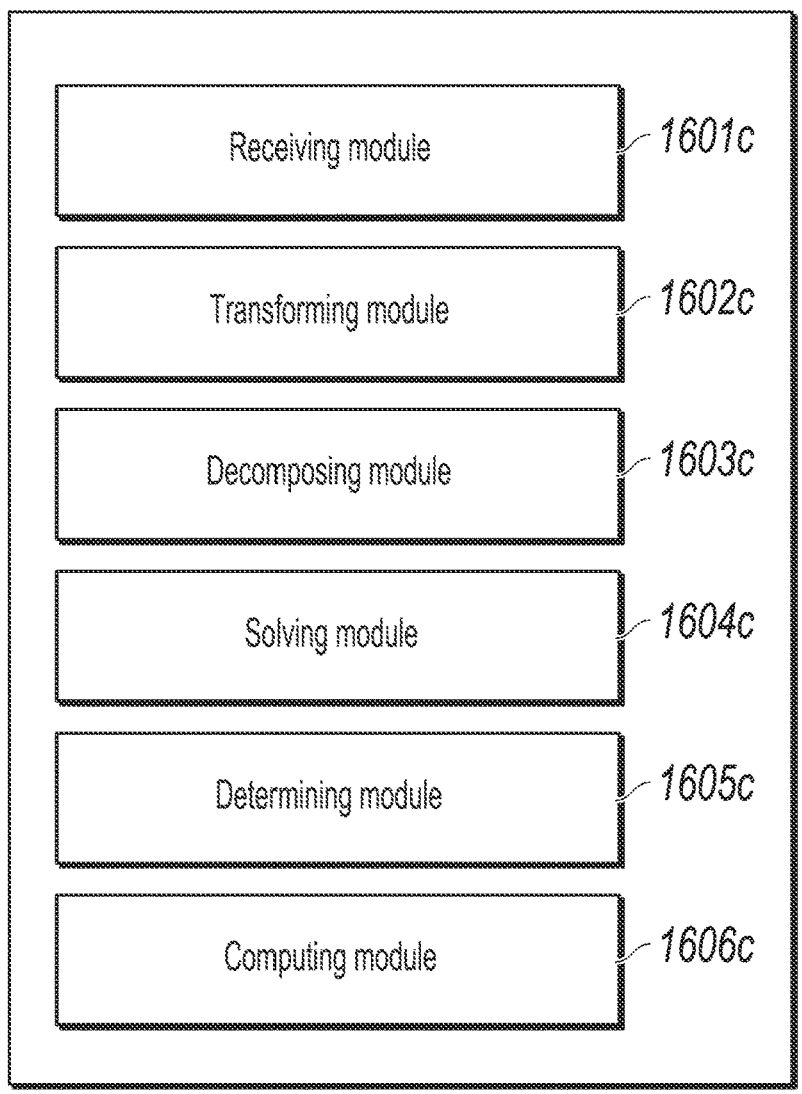

FIG. 16C is a diagram of on example of modules of an apparatus 1600c in accordance with embodiments of this specification. The apparatus 1600c can be an example embodiment of a data processing apparatus for performing resource allocation of M resources among N users into K pools by solving a knapsack problem (KP) using a distributed computing system that includes a number of individual computer-implemented solvers, the KP subject to K global constraints and L local constraints. The apparatus 1600c can correspond to the embodiments described above, and the apparatus 1600c includes the following: a receiving module 1601c for receiving data representing the K global constraints and the L local constraints, wherein each of the K global constraints restricts a respective maximum per-pool cost of the M resources across two or more users, and each of the L local constraints restricts a per-user selection of the M resources; a transforming module 1602c for transforming the KP into a dual problem using K dual multipliers, each of the K dual multipliers corresponding to a respective one of the K global constraints; a decomposing module 1603c for decomposing the dual problem into N sub-problems, each of the N sub-problems corresponding to a respective one of the N users and subject to the L local constraints with respect to (w.r.t.) the respective one of the N users; a solving module 1604c for performing two or more iterations in solving the dual problem, a determining module 1605c for, in one iteration, for each dual multiplier corresponding to a global constraint corresponding to a pool that restricts a maximum per-pool cost of the M resources across two or more users, determining an updated dual multiplier for the global constraint corresponding to the pool to be a non-negative threshold such that: a total cost of resources selected across the N users for the pool corresponding to a dual multiplier that is less than the non-negative threshold exceeds the maximum per-pool cost; and a total cost of resources selected across the N users for the pool corresponding to a dual multiplier that is not less than the non-negative threshold does not exceed the maximum per-pool cost; and a computing module 1606c for computing M decision variables of each of the N users corresponding to the updated dual multiplier in solving each of the N sub-problems corresponding to the each of the N users, wherein each of the M decision variables indicates whether or not to select a respective one of the M resources by the each of the N users.

In an optional embodiment, N is in an order of billions or larger, K is smaller than L, L is in an order of billions or larger.

In an optional embodiment, each of the L constraints corresponds to a subset of M resources and restricts a respective maximum number C of resources to be selected among the subset of the M resources, wherein any subset corresponding to a first constraint out of the L constraints has no common resource with any other subset corresponding to a second constraint out of the L constraints, unless the subset corresponding to the first constraint is a subset of the other subset corresponding to the second constraint.

In an optional embodiment, the apparatus 1600c further includes: another computing module for, in response to determining that a convergence condition is met, computing M decision variables of each user of the N users corresponding to the K dual multipliers; and an allocating module allocating the M resources among the N users according to the M decision variables of each user of the N users.

In an optional embodiment, the apparatus 1600c further includes: another determining module for determining initial values of the K dual multipliers, wherein the initial values of the K dual multipliers are computed based on a sampled version of the KP for resource allocation among S users into the K pools subject to K sampled global constraints and the L local constraints, wherein the S users are sampled from the N users, and each of the K sampled global constraints restricts a respective scaled-down maximum total cost of resources across the S users for each of the K pools.

In an optional embodiment, solving each of the N sub-problems corresponding to the each of the N users includes: for a sub-problem corresponding to a user and for each dual multiplier corresponding to the global constraint corresponding to the pool, computing candidates of the dual multiplier; sorting the candidates of the dual multiplier in a non-increasing order; traversing the candidates of the dual multiplier in the non-increasing order: for each candidate of the dual multiplier; computing M decision variables of the user corresponding to the candidate of the dual multiplier; and computing an incremental cost of selected resources based on the M decision variables of the user corresponding to the candidate of the dual multiplier relative to a cost of selected resources based on the M decision variables of the user corresponding to a candidate of the dual multiplier preceding the candidate of the dual multiplier in the non-increasing order; and wherein a total cost of resources selected across the N users for the pool corresponding to a certain dual multiplier is computed by summing incremental costs of selected resources of the user corresponding to all candidates of the dual multiplier that are larger than or equal to the certain dual multiplier.

In an optional embodiment, computing candidates of the dual multiplier includes computing pair-wise intersection points of M linear functions of the dual multiplier, wherein the M linear functions of the dual multiplier represent M cost-adjusted rewards of the M resources given the dual multiplier.

In an optional embodiment, the apparatus 1600c further includes: another computing module for computing the non-negative threshold based on the candidates of the dual multiplier sorted in the non-increasing order and a respective total cost of resources selected across the N users for the pool corresponding to one of the candidates of the dual multiplier in the non-increasing order.

In an optional embodiment, the apparatus 1600c further includes: an interpolating module for performing interpolation on the candidates of the dual multiplier sorted in the non-increasing order for the computing the non-negative threshold.

In an optional embodiment, the apparatus 1600c further includes: a grouping module for grouping the candidates of the dual multiplier into a plurality of non-uniform budgets; another computing module for computing sums of incremental costs of selected resources of the user corresponding to respective candidates of the dual multiplier in the plurality of non-uniform budgets; and another computing module for computing the non-negative threshold based on the sums of incremental costs.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 16C, it can be interpreted as illustrating an internal functional module and a structure of a data processing apparatus, such as a distributed computing system that includes a number of individual computer-implemented solvers, for performing resource allocation of M resources among N users into K pools by solving a knapsack problem (KP) subject to K global constraints and L local constraints. An execution body in essence can be an electronic device, and the electronic device includes the following: one or more processors and a memory configured to store an executable instruction of the one or more processors.

The one or more processors are configured to receive data representing the K global constraints and the L local constraints, wherein each of the K global constraints restricts a respective maximum per-pool cost of the M resources across two or more users, and each of the L local constraints restricts a per-user selection of the M resources; transforms the KP into a dual problem using K dual multipliers, each of the K dual multipliers corresponding to a respective one of the K global constraints; decomposes the dual problem into N sub-problems, each of the N sub-problems corresponding to a respective one of the N users and subject to the L local constraints with respect to (w.r.t.) the respective one of the N users; performs two or more iterations in solving the dual problem, wherein in one iteration, for each dual multiplier corresponding to a global constraint corresponding to a pool that restricts a maximum per-pool cost of the M resources across two or more users: determines an updated dual multiplier for the global constraint corresponding to the pool to be a non-negative threshold such that: a total cost of resources selected across the N users for the pool corresponding to a dual multiplier that is less than the non-negative threshold exceeds the maximum per-pool cost; and a total cost of resources selected across the N users for the pool corresponding to a dual multiplier that is not less than the non-negative threshold does not exceed the maximum per-pool cost; and compute M decision variables of each of the N users corresponding to the updated dual multiplier in solving each of the N sub-problems corresponding to the each of the N users, wherein each of the M decision variables indicates whether or not to select a respective one of the M resources by the each of the N users.

Optionally, N is in an order of billions or larger, K is smaller than L, L is in an order of billions or larger.

Optionally, each of the L constraints corresponds to a subset of M resources and restricts a respective maximum number C of resources to be selected among the subset of the M resources, wherein any subset corresponding to a first constraint out of the L constraints has no common resource with any other subset corresponding to a second constraint out of the L constraints, unless the subset corresponding to the first constraint is a subset of the other subset corresponding to the second constraint.

Optionally, the one or more processors are configured to, in response to determining that a convergence condition is met, compute M decision variables of each user of the N users corresponding to the K dual multipliers; and allocate the M resources among the N users according to the M decision variables of each user of the N users.

Optionally, the one or more processors are configured to determine initial values of the K dual multipliers, wherein the initial values of the K dual multipliers are computed based on a sampled version of the KP for resource allocation among S users into the K pools subject to K sampled global constraints and the L local constraints, wherein the S users are sampled from the N users, and each of the K sampled global constraints restricts a respective scaled-down maximum total cost of resources across the S users for each of the K pools.

Optionally, solving each of the N sub-problems corresponding to the each of the N users includes: for a sub-problem corresponding to a user and for each dual multiplier corresponding to the global constraint corresponding to the pool, computing candidates of the dual multiplier; sorting the candidates of the dual multiplier in a non-increasing order; traversing the candidates of the dual multiplier in the non-increasing order: for each candidate of the dual multiplier, computing M decision variables of the user corresponding to the candidate of the dual multiplier; and computing an incremental cost of selected resources based on the M decision variables of the user corresponding to the candidate of the dual multiplier relative to a cost of selected resources based on the M decision variables of the user corresponding to a candidate of the dual multiplier preceding the candidate of the dual multiplier in the non-increasing order; and wherein a total cost of resources selected across the N users for the pool corresponding to a certain dual multiplier is computed by summing incremental costs of selected resources of the user corresponding to all candidates of the dual multiplier that are larger than or equal to the certain dual multiplier.

Optionally, computing candidates of the dual multiplier includes computing pair-wise intersections points of M linear functions of the dual multiplier, wherein the M linear functions of the dual multiplier represent M cost-adjusted rewards of the M resources given the dual multiplier.

Optionally, the one or more processors are configured to compute the non-negative threshold based on the candidates of the dual multiplier sorted in the non-increasing order and a respective total cost of resources selected across the N users for the pool corresponding to one of the candidates of the dual multiplier in the non-increasing order.

Optionally, the one or more processors are configured to perform interpolation on the candidates of the dual multiplier sorted in the non-increasing order for the computing the non-negative threshold.

Optionally, the one or more processors are configured to group the candidates of the dual multiplier into a plurality of non-uniform budgets; compute sums of incremental costs of selected resources of the user corresponding to respective candidates of the dual multiplier in the plurality of non-uniform budgets; and compute the non-negative threshold based on the sums of incremental costs.

The techniques described in this specification produce one or more technical effects. In some embodiments, a distributed system that is capable of solving billion-scale real-world knapsack problems (e.g., with billions of decision variables and constraints) is described. The distributed system is developed based on a slightly generalized formulation of KPs and hence can be applied to solve other variants of KPs. By introducing local constraints and treating them separately from global ones, flexible business requirements on each user of resources can be enforced, without increasing the complexity of satisfying global constraints.

As an example, the described techniques can solve an optimization problem for allocating limited resources to each user efficiently, without sacrificing business metrics such as user satisfaction. One example of a use case is marketing campaigns that target hundreds of millions of users. Each campaign may have a global resource limit, as well as, a separate resource limit for each promotion channel. Depending on the nature of the campaign operations, the resources referred here can be in flexible forms, such as monetary and non-monetary promotions. One example of a non-monetary resource constraint is that the total number of mobile App page views allocated to a marketing event may be limited. In some embodiments, individual users may have per-user local constraints. For example, a targeted user cannot participate in more than two promotion channels. In some embodiments, both the decision variables and local constraints can reach billion level while the number of global constraints is often around hundreds.

This specification also describes a greedy algorithm and computer-implemented solver for solving an IP problem subject to constraints having a hierarchal structure. The described greedy algorithm and computer-implemented solver can leverage the hierarchal structure of the constraints and solve the IP problem more efficiently, for example, with a polynomial time complexity. The greedy algorithm and computer-implemented solver can be used to find solutions to real-world scenarios such as resource allocation, product/service promotion and marketing that can be modeled or represented by an IP problem in a more efficient manner.

This specification further describes a synchronous coordinate descent (SCD) algorithm for updating dual multipliers. Unlike existing updating algorithms that requires a hyper-parameter α that needs to be chosen either manually or programmatically, which can be practically cumbersome or computationally intensive, especially for large-scale KPs, the SCD algorithm can be implemented without such a hyper-parameter, thus improving computational efficiency and reducing the computational load. In some embodiments, the SCD algorithm is less prone to constraint violation, thus provide better solutions to the underlying optimization problems.

In some embodiments, the SCD algorithm can be used in the distributed system using the MapReduce or other distributed computing framework or model. The distributed SCD algorithm can be implemented using common distributed platforms such as MPI, HADOOP, and SPARK.

In some embodiments, the described techniques can be generalized to optimize large-scale non-linear problems. The objective function as currently formulated in is linear in the decision variables $x_{i,j}$. The distributed solution framework discussed can be extended to optimize a non-linear objective function, as long as it is decomposable with respect to the decision variables (or users of decision variables).

Described embodiments of the subject matter can include one or more features, alone or in combination. For example, in a first embodiment, a computer-implemented method for performing resource allocation of M resources among N users into K pools by solving a knapsack problem (KP) using a distributed computing system that includes a number of individual computer-implemented solvers, the KP subject to K global constraints and L local constraints. The method includes: receiving data representing the K global constraints and the L local constraints, wherein K is smaller than L, each of the K global constraints restricts a respective maximum per-pool cost of the M resources across two or more users, and each of the L local constraints restricts a per-user selection of the M resources; decomposing the KP into N sub-problems using K dual multipliers, each of the N sub-problems corresponding to a respective one of the N users and subject to the L local constraints with respect to (w.r.t.) the corresponding user, wherein N is in an order of billions or larger, wherein each of the K dual multipliers corresponds to a respective one of the K global constraints; determining the number of individual computer-implemented solvers for solving the N sub-problems; distributing the N sub-problems among the number of individual computer-implemented solvers by assigning each sub-problem to a respective computer-implemented solver; and solving the KP by the distributed computing system by performing two or more iterations, and, in one iteration, the method including: solving each of the N sub-problems by the computer-implemented solver to which the sub-problem was assigned independently, wherein solving each of the N sub-problems includes computing an amount of each of the M resources to be allocated to the corresponding user of the N user; and updating the K dual multipliers based on the amount of each of the M resources to be allocated to the corresponding user of the N user.

The foregoing and other described embodiments can each, optionally, include one or more of the following features:

A first feature, combinable with any of the following features, wherein L is in an order of billions or larger.

A second feature, combinable with any of the following features, wherein: determining the number of individual computer-implemented solvers for solving the N sub-problems includes determining the number of individual computer-implemented solvers for solving the N sub-problems based on a specified computation time for solving the KP; and solving each of the N sub-problems by the computer-implemented solver to which the sub-problem was assigned independently includes solving two or more of the N sub-problems by respective computer-implemented solvers to which the two or more of the N sub-problems were assigned in parallel.

A third feature, combinable with any of the following features, wherein: determining the number of individual computer-implemented solvers for solving the N sub-problems includes determining the number of individual computer-implemented solvers to be N, and solving each of the N sub-problems by one of the number of individual computer-implemented solvers independently includes solving each of the N sub-problems by a respective one of the N individual computer-implemented solvers in parallel.

A fourth feature, combinable with any of the following features, wherein solving each of the N sub-problems by the computer-implemented solver to which the sub-problem was assigned independently includes solving an integer programming (IP) problem by an IP computer-implemented solver independently.

A fifth feature, combinable with any of the following features, further including: determining whether a convergence condition is met based on the K dual multipliers; in response to determining that a convergence condition is met based on the K dual multipliers, solving each of the N sub-problems based on the K dual multipliers by one of the number of individual computer-implemented solvers independently, wherein solving each of the N sub-problems includes computing an amount of each of the M resources to be allocated to the corresponding user of the N user; and allocating the amount of each of the M resources to the corresponding user of the N user.

A sixth feature, combinable with any of the following features, wherein solving each of the N sub-problems further includes computing, for each of the K pools, a per-pool cost of the M resources by the corresponding user based on the amount of each of the M resources to be allocated to the corresponding user.

A seventh feature, combinable with any of the following features, wherein, in one iteration, the method further includes: computing, for each of the K pools, a per-pool cost of the M resources across the N users based on the amount of each of the M resources to be allocated to the corresponding user of the N user; and wherein updating the K dual multipliers based on the amount of each of the M resources to be allocated to the corresponding user of the N user includes updating each of the K dual multipliers w.r.t. a corresponding pool based on a difference between a maximum per-pool cost of the M resources across two or more users for the corresponding pool restricted by a corresponding global constraint and a per-pool cost of the M resources across the N users for the corresponding pool computed based on the amount of each of the M resources to be allocated to the corresponding user of the N user.

For example, in a second embodiment, a computer-implemented method for allocating M resources subject to L constraints, the method including: receiving data representing L constraints, wherein each of the L constraints corresponds to a subset of M resources and restricts a respective maximum number C of resources to be selected among the subset of the M resources, wherein any subset corresponding to a first constraint out of the L constraints has no common resource with any other subset corresponding to a second constraint out of the L constraints, unless the subset corresponding to the first constraint is a subset of the other subset corresponding to the second constraint; determining a topological ordering of the L constraints, wherein the topological ordering defines a traversing order of the L constraints; selecting all the M resources as an initial selection; removing resources from the initial selection by traversing each constraint in the topological ordering of the L constraints, wherein the removing includes: for a constraint l of the L constraints corresponding to a subset $S_l$ of the M resources and restricting a maximum number $C_l$ of resources to be selected out of the subset $S_l$, determining currently selected resources in the subset $S_l$; and unselecting, among the currently selected resources in the subset $S_l$, any resource that is not one of $C_l$ resources that have top $C_l$ rewards among the currently selected resources in the subset $S_l$; and allocating the selected resources after traversing all the L constraints in the topological ordering of the L constraints.

The foregoing and other described embodiments can each, optionally, include one or more of the following features:

A first feature, combinable with any of the following features, wherein: the data representing the L constraints includes L index subsets, each of the L index subsets corresponds to a respective one of the L constraints and includes indexes of a subset of the M resources corresponding to the respective one of the L constraints; and the subset $S_l$ includes indexes of a subset of the M resources corresponding to the constraint l.

A second feature, combinable with any of the following features, wherein the data representing the L constraints includes data representing each of the L constraints by a node in a directed acyclic graph (DAG) data structure, and an edge of the DAG represents a relationship between two of the L constraints corresponding to two nodes of the edge.

A third feature, combinable with any of the following features, further including: obtaining data representing M rewards, each reward corresponding to one of the M resources respectively.

A fourth feature, combinable with any of the following features, further including: sorting the M resources in a non-increasing order according to the M rewards corresponding to the M resources before traversing each subset in the L subsets in the topological ordering of the L subsets; and wherein unselecting, among the currently selected resources in the subset $S_l$, any resource that is not one of $C_l$ resources that have top $C_l$ rewards among the currently selected resources in the subset $S_l$ includes unselecting the any resource that is not one of $C_l$ resources that have top $C_l$ rewards among the currently selected resources in the subset $S_l$ according to the non-increasing order of the M resources.

A fifth feature, combinable with any of the following features, wherein the M rewards are M cost-adjusted rewards respectively, wherein each of the M cost-adjusted rewards includes a reward minus a cost if one of the M resources is selected.

A sixth feature, combinable with any of the following features, wherein the method is performed for one of N users in performing resource allocation of the M resources among the N users into K pools subject to K global constraints and the L constraints, wherein each of the L constraints restricts a respective maximum number of resources out of the M resources to be selected by a single user, and each of the K global constraints limits resources allocated for each pool across the N users.

For example, in a third embodiment, a computer-implemented method for performing resource allocation, including: using a distributed computing system that includes a number of individual computer-implemented solvers for performing resource allocation of M resources among N users into K pools by solving a knapsack problem (KP) subject to K global constraints and L local constraints: receiving data representing the K global constraints and the L local constraints, wherein each of the K global constraints restricts a respective maximum per-pool cost of the M resources across two or more users, and each of the L local constraints restricts a per-user selection of the M resources; transforming the KP into a dual problem using K dual multipliers, each of the K dual multipliers corresponding to a respective one of the K global constraints; decomposing the dual problem into N sub-problems, each of the N sub-problems corresponding to a respective one of the N users and subject to the L local constraints with respect to (w.r.t.) the respective one of the N users; performing two or more iterations in solving the dual problem, wherein in one iteration, for each dual multiplier corresponding to a global constraint corresponding to a pool that restricts a maximum per-pool cost of the M resources across two or more users: determining an updated dual multiplier for the global constraint corresponding to the pool to be a non-negative threshold such that: a total cost of resources selected across the N users for the pool corresponding to a dual multiplier that is less than the non-negative threshold exceeds the maximum per-pool cost; and a total cost of resources selected across the N users for the pool corresponding to a dual multiplier that is not less than the non-negative threshold does not exceed the maximum per-pool cost; and computing M decision variables of each of the N users corresponding to the updated dual multiplier in solving each of the N sub-problems corresponding to the each of the N users, wherein each of the M decision variables indicates whether or not to select a respective one of the M resources by the each of the N users.

The foregoing and other described embodiments can each, optionally, include one or more of the following features:

A first feature, combinable with any of the following features, wherein N is in an order of billions or larger, K is smaller than L, L is in an order of billions or larger.

A second feature, combinable with any of the following features, wherein each of the L constraints corresponds to a subset of M resources and restricts a respective maximum number C of resources to be selected among the subset of the M resources, wherein any subset corresponding to a first constraint out of the L constraints has no common resource with any other subset corresponding to a second constraint out of the L constraints, unless the subset corresponding to the first constraint is a subset of the other subset corresponding to the second constraint.

A third feature, combinable with any of the following features, further including: in response to determining that a convergence condition is met, computing M decision variables of each user of the N users corresponding to the K dual multipliers; and allocating the M resources among the N users according to the M decision variables of each user of the N users.

A fourth feature, combinable with any of the following features, further including determining initial values of the K dual multipliers, wherein the initial values of the K dual multipliers are computed based on a sampled version of the KP for resource allocation among S users into the K pools subject to K sampled global constraints and the L local constraints, wherein the S users are sampled from the N users, and each of the K sampled global constraints restricts a respective scaled-down maximum total cost of resources across the S users for each of the K pools.

A fifth feature, combinable with any of the following features, wherein solving each of the N sub-problems corresponding to the each of the N users includes: for a sub-problem corresponding to a user and for each dual multiplier corresponding to the global constraint corresponding to the pool, computing candidates of the dual multiplier; sorting the candidates of the dual multiplier in a non-increasing order; traversing the candidates of the dual multiplier in the non-increasing order: for each candidate of the dual multiplier, computing M decision variables of the user corresponding to the candidate of the dual multiplier; and computing an incremental cost of selected resources based on the M decision variables of the user corresponding to the candidate of the dual multiplier relative to a cost of selected resources based on the M decision variables of the user corresponding to a candidate of the dual multiplier preceding the candidate of the dual multiplier in the non-increasing order; and wherein a total cost of resources selected across the N users for the pool corresponding to a certain dual multiplier is computed by summing incremental costs of selected resources of the user corresponding to all candidates of the dual multiplier that are larger than or equal to the certain dual multiplier.

A sixth feature, combinable with any of the following features, wherein computing candidates of the dual multiplier includes computing pair-wise intersections points of M linear functions of the dual multiplier, wherein the M linear functions of the dual multiplier represent M cost-adjusted rewards of the M resources given the dual multiplier.

A seventh feature, combinable with any of the following features, further including computing the non-negative threshold based on the candidates of the dual multiplier sorted in the non-increasing order and a respective total cost of resources selected across the N users for the pool corresponding to one of the candidates of the dual multiplier in the non-increasing order.

An eighth feature, combinable with any of the following features, further including performing interpolation on the candidates of the dual multiplier sorted in the non-increasing order for the computing the non-negative threshold.

A ninth feature, combinable with any of the following features, further including: grouping the candidates of the dual multiplier into a plurality of non-uniform budgets; computing sums of incremental costs of selected resources of the user corresponding to respective candidates of the dual multiplier in the plurality of non-uniform budgets; and computing the non-negative threshold based on the sums of incremental costs.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data.

The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for performing resource allocation, the method comprising:
    using a distributed computing system that includes a number of individual computer-implemented solvers for performing resource allocation of M resources among N users into K pools by solving a knapsack problem (KP) subject to K global constraints and L local constraints:
    receiving data representing the K global constraints and the L local constraints, wherein K is smaller than L, each of the K global constraints restricts a respective maximum per-pool cost of the M resources across two or more users, and each of the L local constraints restricts a per-user selection of the M resources;
    decomposing the KP into N sub-problems using K dual multipliers, each of the N sub-problems corresponding to a respective one of the N users and subject to the L local constraints with respect to (w.r.t.) the corresponding user, wherein each of the K dual multipliers corresponds to a respective one of the K global constraints;
    determining the number of individual computer-implemented solvers for solving the N sub-problems;
    distributing the N sub-problems among the number of individual computer-implemented solvers by assigning each sub-problem to a respective computer-implemented solver; and solving the KP by the distributed computing system by performing two or more iterations, and, in one iteration, the method comprising:

solving each of the N sub-problems by the computer-implemented solver to which the sub-problem was assigned independently, wherein solving each of the N sub-problems comprises computing an amount of each of the M resources to be allocated to the corresponding user of the N user, computing, for each of the K pools, a per-pool cost of the M resources across the N users based on the amount of each of the M resources to be allocated to the corresponding user of the N user, and updating each of the K dual multipliers w.r.t. a corresponding pool based on a difference between a maximum per-pool cost of the M resources across two or more users for the corresponding pool restricted by a corresponding global constraint and a per-pool cost of the M resources across the N users for the corresponding pool computed based on the amount of each of the M resources to be allocated to the corresponding user of the N user.

2. The method of claim 1, wherein L is on an order of billions or larger.

3. The method of claim 1, wherein:

determining the number of individual computer-implemented solvers for solving the N sub-problems comprises determining the number of individual computer-implemented solvers for solving the N sub-problems based on a specified computation time for solving the KP; and solving each of the N sub-problems by the computer-implemented solver to which the sub-problem was assigned independently comprises solving two or more of the N sub-problems by computer-implemented solvers to which the two or more of the N sub-problem were assigned in parallel.

4. The method of claim 1, wherein:

determining the number of individual computer-implemented solvers for solving the N sub-problems comprises determining the number of individual computer-implemented solvers to be N, and solving each of the N sub-problems by the computer-implemented solver to which the sub-problem was assigned independently comprises solving each of the N sub-problems by a respective one of the individual computer-implemented solvers in parallel.

5. The method of claim 1, wherein solving each of the N sub-problems by the computer-implemented solver to which the sub-problem was assigned independently comprises solving an integer programming (IP) problem by an IP solver independently.

6. The method of claim 1, wherein solving each of the N sub-problems further comprises computing, for each of the K pools, a per-pool cost of the M resources by the corresponding user based on the amount of each of the M resources to be allocated to the corresponding user.

7. A distributed computing system for performing resource allocation of M resources among N users into K pools by solving a knapsack problem (KP) subject to K global constraints and L local constraints, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving data representing the K global constraints and the L local constraints, wherein K is smaller than L, each of the K global constraints restricts a respective maximum per-pool cost of the M resources across two or more users, and each of the L local constraints restricts a per-user selection of the M resources;

decomposing the KP into N sub-problems using K dual multipliers, each of the N sub-problems corresponding to a respective one of the N users and subject to the L local constraints with respect to (w.r.t.) the corresponding user wherein each of the K dual multipliers corresponds to a respective one of the K global constraints;

determining a number of individual processors for solving the N sub-problems independently;

distributing the N sub-problems among the number of individual processors; and solving the KP by the distributed computing system by performing two or more iterations, and, in one iteration, the operations comprising:

solving each of the N sub-problems by one of the number of individual processors independently, wherein solving each of the N sub-problems comprises computing an amount of each of the M resources to be allocated to the corresponding user of the N user, computing, for each of the K pools, a per-pool cost of the M resources across the N users based on the amount of each of the M resources to be allocated to the corresponding user of the N user, and updating each of the K dual multipliers w.r.t. a corresponding pool based on a difference between a maximum per-pool cost of the M resources across two or more users for the corresponding pool restricted by a corresponding global constraint and a per-pool cost of the M resources across the N users for the corresponding pool computed based on the amount of each of the M resources to be allocated to the corresponding user of the N user.

8. The distributed computing system of claim 7, wherein L is in an order of billions or larger.

9. The distributed computing system of claim 7, wherein:

determining the number of individual processors for solving the N sub-problems comprises determining the number of individual processors for solving the N sub-problems based on a specified computation time for solving the KP; and solving each of the N sub-problems by one of the number of individual processors independently comprises solving each of the N sub-problems by one of the number of individual processors in parallel.

10. The distributed computing system of claim 7, wherein:

determining the number of individual processors for solving the N sub-problems comprises determining the number of individual processors to be N, and solving each of the N sub-problems by one of the number of individual processors independently comprises solving each of the N sub-problems by a respective one of the individual processors in parallel.

11. The distributed computing system of claim 7, wherein solving each of the N sub-problems by one of the number of individual processors independently comprises solving an integer programming (IP) problem by an IP processor independently.

12. The distributed computing system of claim 7, wherein solving each of the N sub-problems further comprises computing, for each of the K pools, a per-pool cost of the M resources by the corresponding user based on the amount of each of the M resources to be allocated to the corresponding user.

13. A non-transitory, computer-readable storage medium storing one or more instructions executable by a computer system to perform operations for performing resource allocation, the operations comprising:
  using a distributed computing system that includes a number of individual computer-implemented solvers for performing resource allocation of M resources among N users into K pools by solving a knapsack problem (KP) subject to K global constraints and L local constraints:
  receiving data representing the K global constraints and the L local constraints, wherein K is smaller than L, each of the K global constraints restricts a respective maximum per-pool cost of the M resources across two or more users, and each of the L local constraints restricts a per-user selection of the M resources;
  decomposing the KP into N sub-problems using K dual multipliers, each of the N sub-problems corresponding to a respective one of the N users and subject to the L local constraints with respect to (w.r.t.) the corresponding user wherein each of the K dual multipliers corresponds to a respective one of the K global constraints;
  determining the number of individual computer-implemented solvers for solving the N sub-problems;
  distributing the N sub-problems among the number of individual computer-implemented solvers by assigning each sub-problem to a respective computer-implemented solver; and
  solving the KP by the distributed computing system by performing two or more iterations, and, in one iteration, the operations comprising:
    solving each of the N sub-problems by the computer-implemented solver to which the sub-problem was assigned independently, wherein solving each of the N sub-problems comprises computing an amount of each of the M resources to be allocated to the corresponding user of the N user,
    computing, for each of the K pools, a per-pool cost of the M resources across the N users based on the amount of each of the M resources to be allocated to the corresponding user of the N user, and
    updating each of the K dual multipliers w.r.t. a corresponding pool based on a difference between a maximum per-pool cost of the M resources across two or more users for the corresponding pool restricted by a corresponding global constraint and a per-pool cost of the M resources across the N users for the corresponding pool computed based on the amount of each of the M resources to be allocated to the corresponding user of the N user.

14. The non-transitory, computer-readable storage medium of claim 13, wherein L is on an order of billions or larger.

15. The non-transitory, computer-readable storage medium of claim 13, wherein:
  determining the number of individual computer-implemented solvers for solving the N sub-problems comprises determining the number of individual computer-implemented solvers for solving the N sub-problems based on a specified computation time for solving the KP; and
  solving each of the N sub-problems by the computer-implemented solver to which the sub-problem was assigned independently comprises solving two or more of the N sub-problems by computer-implemented solvers to which the two or more of the N sub-problem were assigned in parallel.

16. The non-transitory, computer-readable storage medium of claim 13, wherein:
  determining the number of individual computer-implemented solvers for solving the N sub-problems comprises determining the number of individual computer-implemented solvers to be N, and
  solving each of the N sub-problems by the computer-implemented solver to which the sub-problem was assigned independently comprises solving each of the N sub-problems by a respective one of the individual computer-implemented solvers in parallel.

17. The non-transitory, computer-readable storage medium of claim 13, wherein solving each of the N sub-problems by the computer-implemented solver to which the sub-problem was assigned independently comprises solving an integer programming (IP) problem by an IP solver independently.

18. The non-transitory, computer-readable storage medium of claim 13, wherein solving each of the N sub-problems further comprises computing, for each of the K pools, a per-pool cost of the M resources by the corresponding user based on the amount of each of the M resources to be allocated to the corresponding user.

* * * * *